United States Patent

Ejiri et al.

[11] Patent Number: 5,969,969
[45] Date of Patent: Oct. 19, 1999

[54] VEHICLE DRIVING SUPPORT SYSTEM WHICH IS RESPONSIVE TO ENVIRONMENTAL CONDITIONS

[75] Inventors: Masakazu Ejiri, Tokorozawa; Kohji Kamejima, Chiyoda-machi; Tomoyuki Hamada, Abiko; Takae Sakamoto, Chiyoda-machi; Yotaro Kimura, Hitachi, all of Japan

[73] Assignee: Hitachi, Ltd., Tokyo, Japan

[21] Appl. No.: 08/808,810

[22] Filed: Feb. 28, 1997

Related U.S. Application Data

[63] Continuation of application No. 08/605,682, Feb. 22, 1996, abandoned, which is a continuation of application No. 08/128,240, Sep. 29, 1993, abandoned.

[30] Foreign Application Priority Data

Sep. 30, 1992 [JP] Japan .................................... 4-261084
Mar. 15, 1993 [JP] Japan .................................... 5-053640

[51] Int. Cl.$^6$ .................................................. B60R 21/00
[52] U.S. Cl. ............................... 364/424.051; 364/424.01
[58] Field of Search ....................... 364/426.01, 424.051; 395/22; 340/980

[56] References Cited

U.S. PATENT DOCUMENTS

| | | | |
|---|---|---|---|
| 4,589,081 | 5/1986 | Masaa et al. | 364/554 |
| 4,931,930 | 6/1990 | Shyu et al. | 364/424.045 |
| 5,051,735 | 9/1991 | Furukawa | 340/980 |
| 5,061,996 | 10/1991 | Schiffman | 340/980 |
| 5,161,632 | 11/1992 | Asayama | 180/167 |
| 5,173,859 | 12/1992 | Deering | 364/426.01 |
| 5,189,619 | 2/1993 | Adachi et al. | 364/426.044 |
| 5,251,680 | 10/1993 | Minezawa et al. | 180/169 |
| 5,285,523 | 2/1994 | Takahashi | 395/22 |

FOREIGN PATENT DOCUMENTS

| | | |
|---|---|---|
| A-0392953 | 10/1990 | European Pat. Off. |
| A-0549909 | 7/1993 | European Pat. Off. |
| A-2320613 | 11/1974 | Germany |
| A-3813083 | 2/1989 | Germany |
| A-3092436 | 4/1991 | Japan |
| A-3092437 | 4/1991 | Japan |

*Primary Examiner*—Raymond J. Bayerl
*Assistant Examiner*—Steven P. Sax
*Attorney, Agent, or Firm*—Antonelli, Terry, Stout, & Kraus, LLP

[57] ABSTRACT

A vehicle driving support system is provided with an environment detecting means for detecting objects existing around a vehicle and for producing output environment information, a command unit to specify a running mode of the vehicle, information processing means for generating driving operation reference information suitable for the specified running mode of the vehicle by processing the environment information specified in accordance with the running mode and a display unit to display the driving operation reference information. The information processing means monitors the inter-vehicle distance to a vehicle stopping in front of the vehicle and generates driving operation reference information to inform the driver of the starting of the precedent vehicle when the vehicle is in the congestion running mode. When the vehicle is in the narrow passing running mode, an object near the vehicle having a relative positional relationship to said vehicle is mounted and driving operation reference information is generated to inform the driver thereof. When the vehicle is in the parking running mode, driving operation reference information is generated to inform the driver of the distribution of the objects existing in a parking lot.

24 Claims, 34 Drawing Sheets

| NAME | DATA |
|---|---|
| CONDITION | CHARACTER STRING |
| RUNNING REFERENCE DISTANCE | NUMERAL |
| CONGESTION REFERENCE DISTANCE | NUMERAL |
| VEHICLE SPEED | NUMERAL |
| DISTANCE INFORMATION DETECTOR OUTPUT | NUMERAL |
| ... | ... |

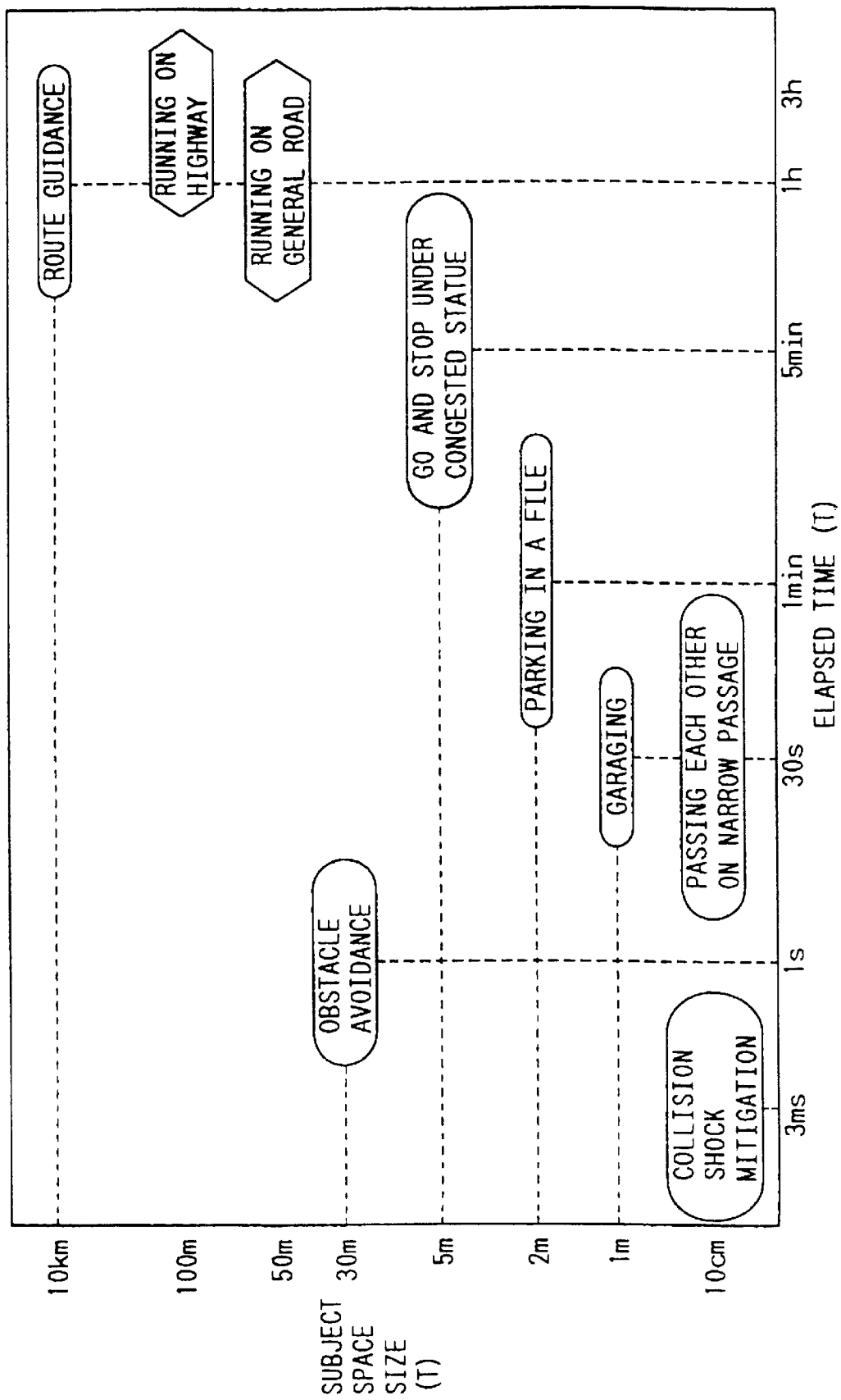

VEHICLE DRIVING SUPPORT SYSTEM WHICH IS RESPONSIVE TO ENVIRONMENTAL CONDITIONS

This application is a continuation of application Ser. No. 08/605,682, filed on Feb. 22, 1996 (now abandoned); which is a continuation of application Ser. No. 08/128,240, filed on Sep. 29, 1993 (now abandoned).

BACKGROUND OF THE INVENTION

The present invention relates to a vehicle driving support system which provides a driver with reference information for driving a vehicle by detecting and processing environmental conditions around the vehicle.

There have been various automatic tracking control systems which detect the speed of a preceding vehicle and determine the distance between the subject and the preceding vehicle, that is the inter-vehicle distance, based on the detected speed, and which maintain the distance between the two vehicles in order to support long-distance driving with safety.

Such a system is already disclosed, for example, in Japanese Patent Application Laid-Open No. 3-295000 (1991).

There also have been alarm systems which detect the distance between a vehicle and a preceding vehicle and which produce an alarm to caution the driver against a rear-end collision. Such alarm systems are described in Japanese Patent Application Laid-open No. 4-201641 (1992) and No. 4-201643 (1992).

The systems mentioned above will be useful when vehicles are continuously running on ordinary roads or highways. From a running mode point of view, however, vehicles are driven more often in a congestion running mode on ordinary streets than in a high speed running mode on highways. When they are being driven on ordinary streets, they are generally forced to repeat stopping and slow running due to traffic signals and congestion. A driver, therefore, is kept busy when a vehicle is driven in the congestion running mode, and has to keep watching the driving state of the preceding vehicle, as well as watching the state of the street beyond the preceding vehicle. In such a situation, the mental and physical burdens imposed on the driver will be considerable.

Now, there are a lot of cases where a driver runs a vehicle in a narrow space, such as in a narrow passage in a downtown area, in a narrow parking lot or in a garage. In order to perform such driving reliably, a well experienced and skillful driving technique is indispensable. Especially, for beginners, drivers in name only, and physically handicapped persons, such driving conditions present a most difficult task. They have to bear both mental and physical stresses from such driving.

The control system and the alarm system in the systems described above have no support function for a driving operation in a congestion running mode or a narrow space running mode.

SUMMARY OF THE INVENTION

One of the objects of the present invention is to provide a vehicle driving support system which is capable of reducing the driver's burdens in plural kinds of running modes, such as the congestion running mode, narrow space running mode and the like, thereby facilitating easy, safe and effective driving for the driver.

Another object of the present invention is to provide a support system which is capable of reducing the burden on the driver to watch in the forward direction in a congestion running mode on a congested street, where the vehicle is forced to repeat stopping and slow running, by monitoring the driving state of the preceding vehicle and informing the driver of any change in that driving state.

A further object of the present invention is to provide a support system which is capable of facilitating a driving operation in a narrow space running mode, where the vehicle is running through a narrow passage, a narrow parking lot or a garage, by providing the driver with information concerning obstacles existing around the vehicle.

An even further object of the present invention is to provide a support system which is capable of selecting suitable driving operation reference information corresponding to plural kinds of running modes of the vehicle and of providing such information to a driver.

A vehicle driving support system according to the present invention generates driving operation reference information suitable to a running mode of a vehicle through processing of environmental data obtained by detecting environmental conditions around a vehicle based on various kinds of running modes of said vehicle and provides such information to the driver.

Said vehicle driving support system according to the present invention comprises environmental condition detecting means for detecting objects around the vehicle to output environmental data, running mode specifying means for selectively specifying the running mode of said vehicle from plural kinds of modes, information processing means for generating driving operation reference information suitable to the running mode of said vehicle through processing of said environmental data based on the selected running mode and information means for supplying the driving operation reference information to the driver.

More particularly, said running mode specifying means comprises input means for specifying the mode of said vehicle, in a normal running mode, such as high speed running or a congestion running mode, by the driver's operation. And, when the vehicle is in the congestion running mode, the information processing means monitors the distance between the vehicle and the preceding vehicle and generates driving operation reference information to inform the driver of the starting of the preceding vehicle.

Further, the running mode specify means comprises input means for specifying the mode of the vehicle, in a narrow passage running mode or in a parking lot running mode. And, when the vehicle is in the narrow passage running mode, the information processing means monitors objects positioned around the vehicle from the aspect of relative position and generates driving operation reference information for the driver. On the other hand, when the vehicle is in the parking lot running mode, the information processing means generates driving operation reference information of the positioning and distribution of the objects existing in the parking lot for the driver.

Furthermore, the vehicle driving support system comprises a communication unit to obtain additional environmental information by communicating with a ground station or other vehicles.

BRIEF DESCRIPTION OF THE DRAWINGS

FIG. 43 a graph showing various running modes of vehicle expressed by a relationship between elapsed time and subject space size.

DETAILED DESCRIPTION OF THE PREFERRED EMBODIMENTS

Figure 1:
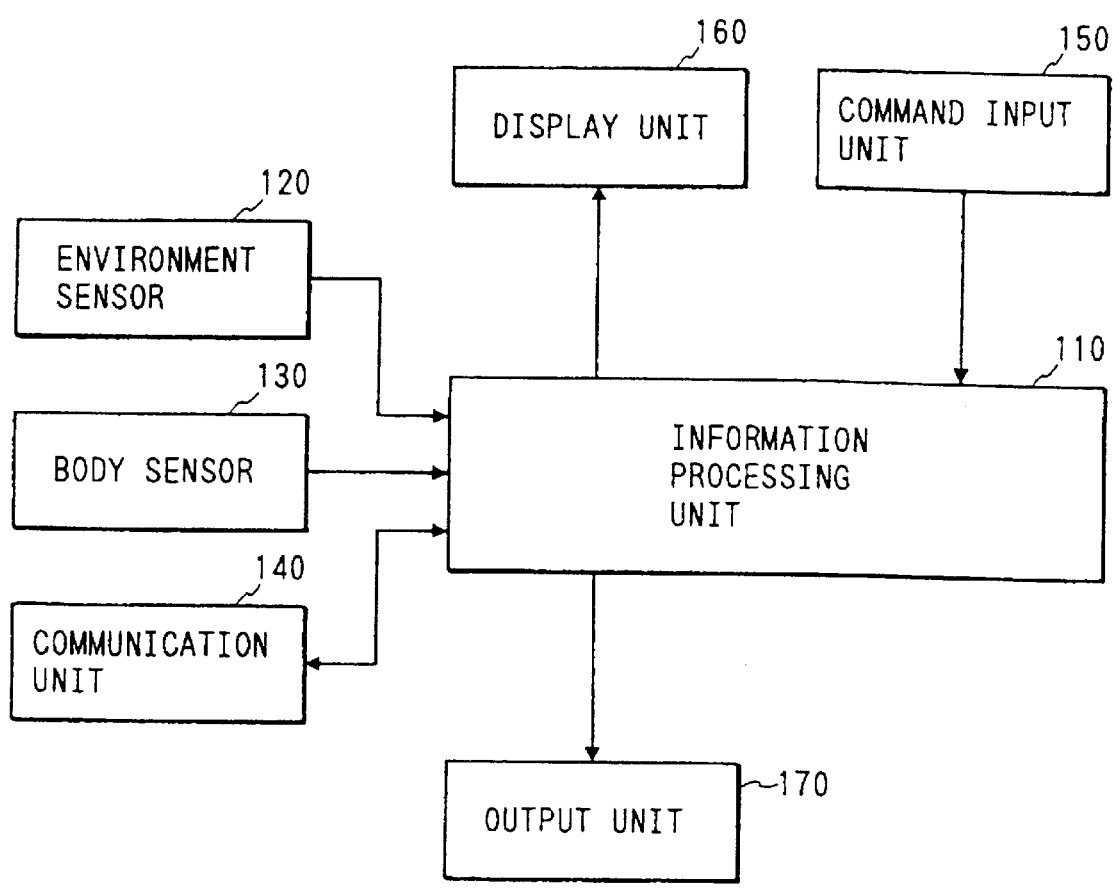
FIG. 1 is a block diagram showing the basic structure of a vehicle driving support system in accordance with the present invention.

Referring to the drawings, various embodiments of the present invention will be explained below with respect to control of a vehicle.

Firstly, some explanation will be given concerning various running modes of the vehicle which drivers encounter. When a vehicle runs, for example, on a complicated street in a downtown area of the city, the driver will be forced to make many decisions due to the traffic situation, congestion, etc. According to such traffic information, the driver must decide on the proper running mode for route guidance, highway running, general road running, low speed running in a congested area, repetitive stops, lengthwise parking, putting his vehicle into a garage, meeting another vehicle in a narrow passage, avoiding a collision, etc. Basically, those decisions will be made of one's own accord. FIG. 43 shows the relationship between elapsed time and object space size in relation to each of those running modes. In order to support the driver for two or more running modes, a close relationship between the driver and the vehicle is indispensable. FIG. 43 shows a case in which running modes are changed frequently among highway running, general road running, low speed running in an area of traffic congestion, and repetitive stopping. In fact, those running modes are so important that they must be considered carefully. A driver also frequently encounters narrow passage running mode driving in a narrow passage and parking running mode driving in a parking lot or a garage.

A vehicle driving support system in accordance with the present invention generates driving operation reference information corresponding to such various running modes suitable for their driving operation to provide necessary information to the driver.

Figure 2:
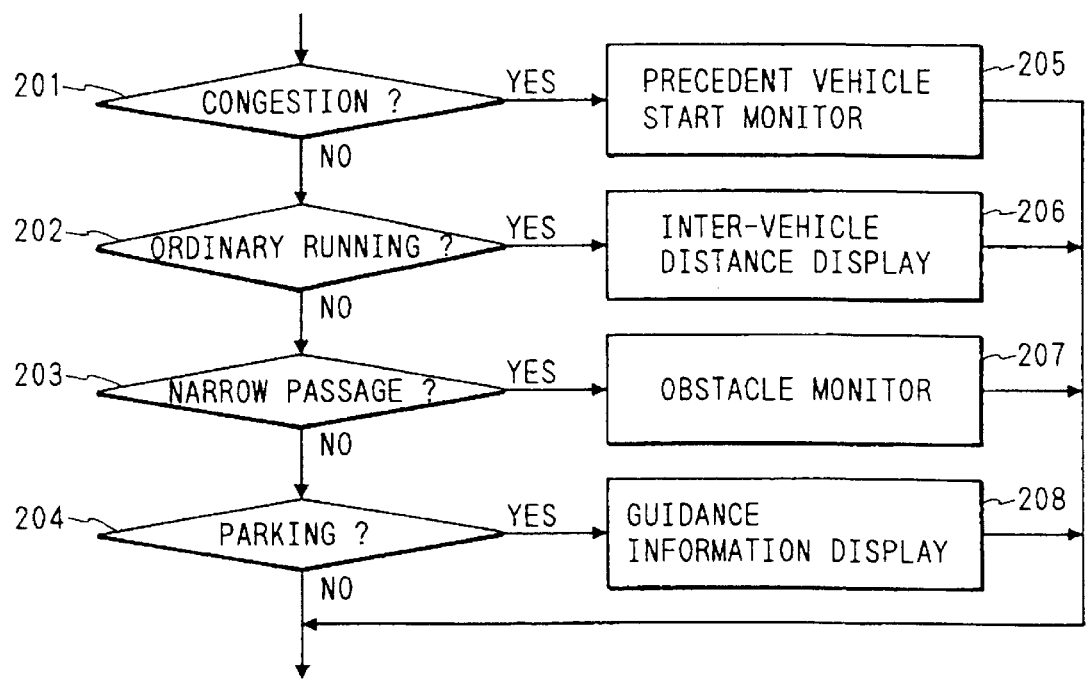
FIG. 2 is a flow diagram showing data processing to generate driving operation reference information executed by the information processing unit in FIG. 1.

FIG. 1 is a block diagram showing the basic structure of a vehicle driving support system in accordance with the present invention, and FIG. 2 is a flow diagram showing data processing to generate driving operation reference information executed by the information processing unit.

An information processing unit 110 is composed of mainly a micro processing unit which generates driving operation reference information suitable for a running mode to output on a display unit 160 by processing the data, object detecting data concerning objects located around a vehicle obtained from an environmental condition sensor 120, self-vehicle condition detected data obtained from a body sensor 130 and other environmental data obtained from a communication unit 140, in accordance with the running mode specified by a command signal given from a command unit 150. The information processing unit 110 also provides a control signal for an output unit 110 which generates alarm sounds or, if necessary, automatically operates a part of a driving operation mechanism of the vehicle.

FIG. 2 is a flow diagram showing data processing to generate driving operation reference information, executed by the information processing unit, showing normal running, congestion running, narrow passage running and parking running conditions as running modes of the vehicle. The information processing unit 110 analyzes the command signal in decision operations 201–204. The congestion running mode 201 initiates the precedent vehicle start monitoring operation 205 to inform the driver of the driving operation reference information that the preceding vehicle which was stopping ahead has started to running again. In a normal running mode 202, the inter-vehicle distance displaying operation 206 is initiated to inform the driver of the driving operation reference information concerning a suitable distance between the preceding and the subject vehicles. In a narrow passage running mode 203, the obstacle monitoring operation 207 is initiated to inform the driver of the obstacles existing and approaching the self-vehicle. Finally, in a parking running mode 204, the guidance information displaying operation 208 is initiated to inform the driver of the location and distribution of objects in a parking lot through which the vehicle is passing.

Figure 3:
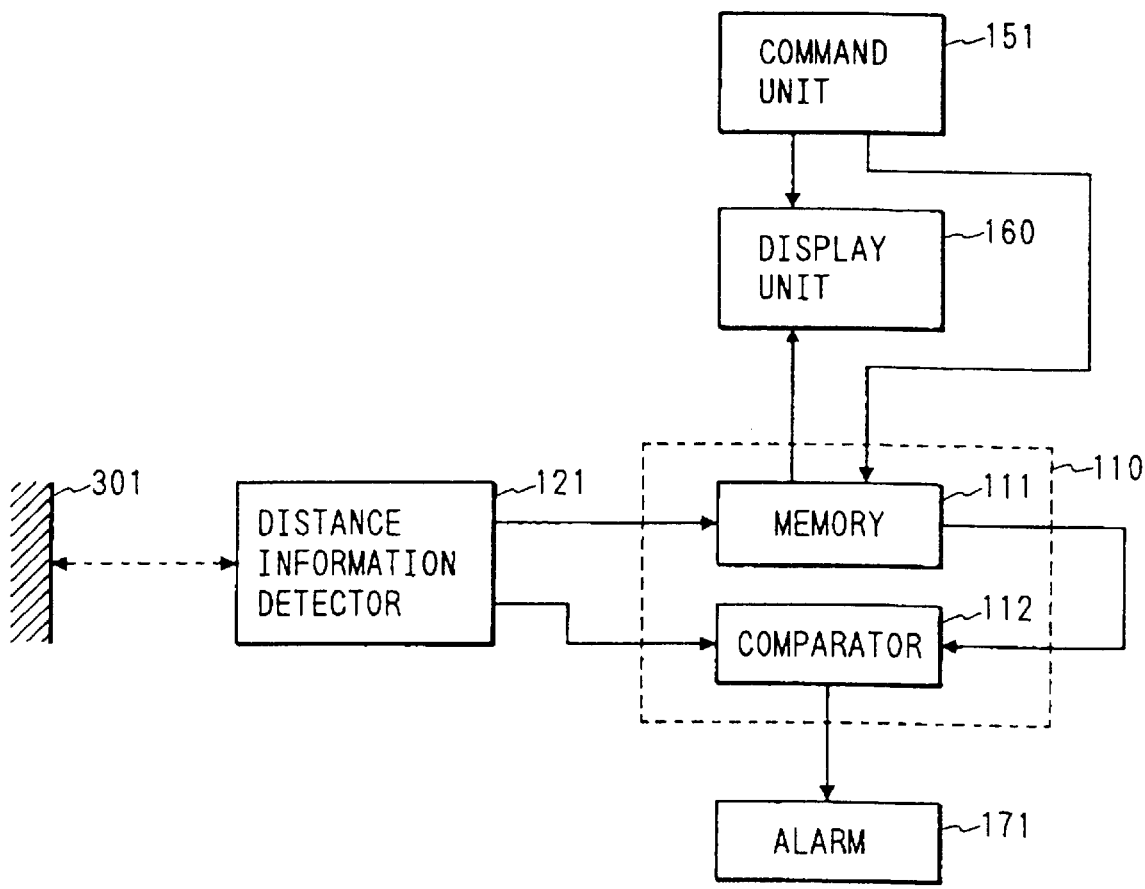
FIG. 3 is a block diagram showing the partial structure in one embodiment of a driving support system in accordance with the present invention.
Figure 4:
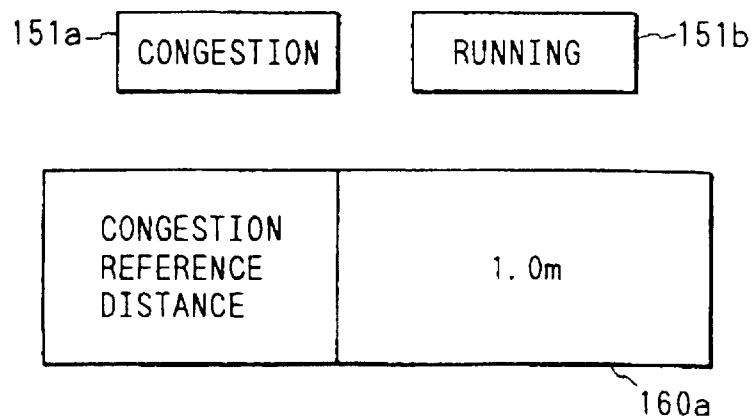
FIG. 4 shows a configuration of a command unit and a display unit in the embodiment shown in FIG. 3.
Figure 5:
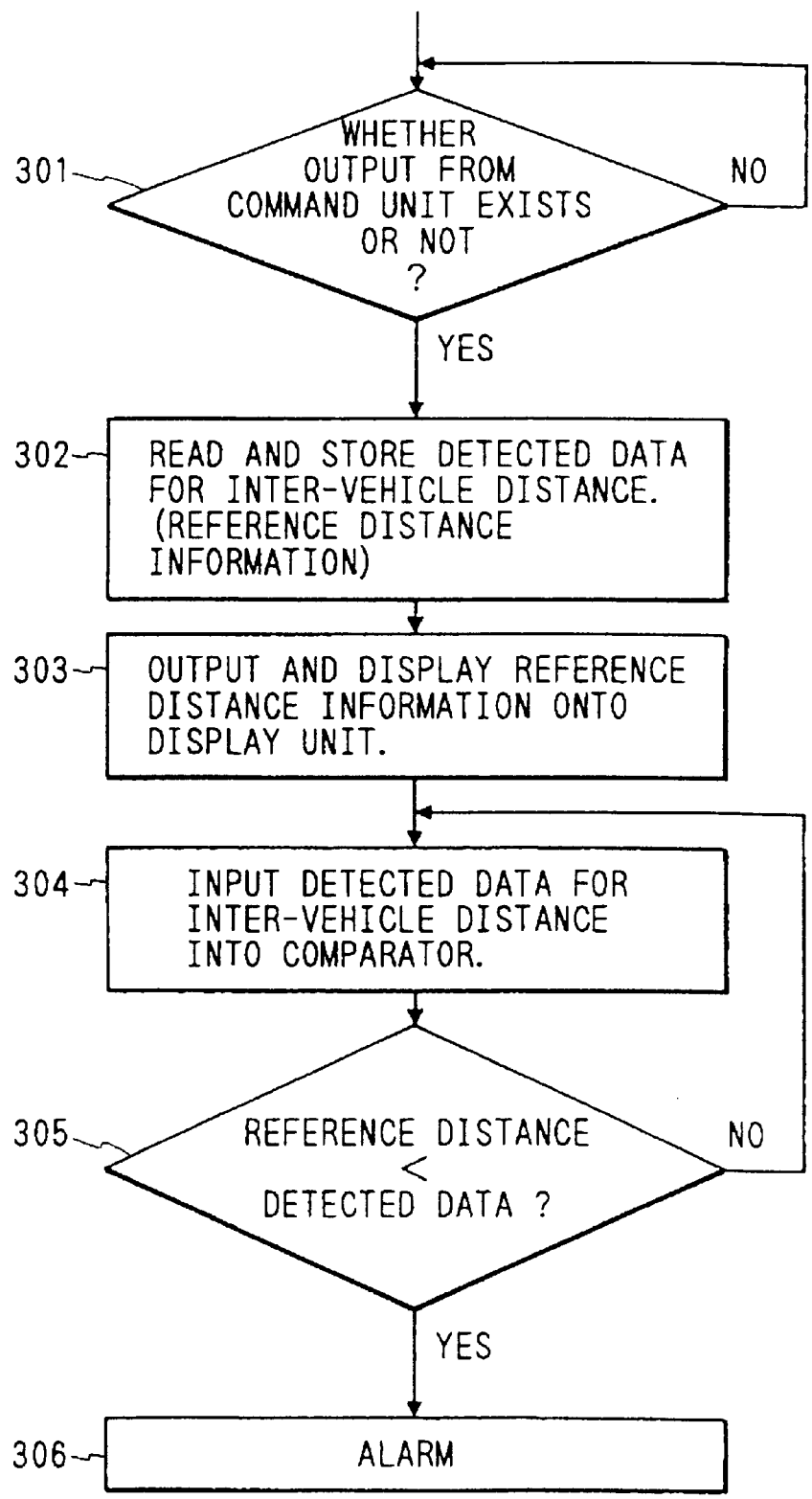
FIG. 5 is a flow diagram showing data processing executed by the information processing unit in the embodiment shown in FIG. 3.

Referring next to FIG. 3–FIG. 5, an embodiment of a partial structure of said driving support system will be explained in detail. The function of the structure in this embodiment is to generate driving operation reference information corresponding to a congestion running condition and a normal running condition, and the function thereof is realized by means of a data processing function of a micro processing unit.

In FIG. 3, a distance information detector 121, forming a part of the environmental condition detector 120, is detecting an object 301, such as a rear part of a vehicle positioned ahead of the vehicle. A command unit 151, generating a command signal to specify running modes, is formed as a part of the command input unit 150, a memory 111 and a comparator 112 forms a part of the information processing unit 110, and an alarm 171 forms a part of the output unit 170.

The distance information detector, 121 comprises a distance measuring instrument which utilizes ultrasonic waves, a laser beam or the like. The command unit 151 is provided near the steering wheel and has push-buttons which are used by a driver to select and input each of the running modes. The push-buttons include, as shown in FIG. 4, a button 151a for congestion and a button 151b for normal running.

The memory 111 in the information processing unit 110 is used to store various information, including the reference distance information corresponding to each of the running modes output from the command unit 151. When the running mode is the congestion mode, the reference distance information is detected inter-vehicle distance data obtained from the distance information detector 121 at the time the command signal is input. And, when the running mode is the normal running mode, the reference distance information is detected inter-vehicle distance data obtained from the distance information detector 121 at that time or is an inter-vehicle distance value necessary for safe driving. The comparator 112 compares the detected inter-vehicle distance output from the distance information detector 121 with the reference distance information output from the memory 111, and outputs the result. The display unit 160 displays the labeling character message of the running mode directed from the command unit 151 and the reference distance information output from the memory 111 corresponding to this running mode. This display unit 160, as shown in FIG. 4, is provided beside the push-buttons 151a and 151b of the command unit 151 near the steering wheel. The unit has a display window 160a for the congestion or running message and the reference distances. The display unit 160 also may comprise a head-up display so that data can be displayed on the wind shield.

The alarm 171 generates alarm sounds based on the result of the comparison output from the comparator 112.

Referring next to FIG. 5, the operation of the embodiment described above will be explained. In this embodiment, driving is supported according to the traffic condition. In process 301, the information processing unit 110 monitors the command signal sent from the command unit 151. For example, by pushing the congestion push-button 151a of the command unit 151 while the subject vehicle stops on a congested road, a signal is generated and the processing moves to process 302. In process 302, in accordance with the command signal generated by pushing the congestion push-button 151a, the detected inter-vehicle distance data output from the distance information sensor 121 is read and stored in the memory 111. The process 302 is executed only when the push-button is pushed and the command signal is generated. The processing, next, moves to process 303 and the reference distance information is output to the display unit 160. The display unit 160 displays the labeling message concerning the running mode and the reference distance information corresponding to the command signal output from the command unit 151.

In process 304, the detected inter-vehicle distance data detected with the distance information detector 121 is periodically read and supplied to the comparator 112. In process 305, the inter-vehicle distance is compared with the reference distance information output from the memory 111.

When the detected inter-vehicle distance data exceeds the reference distance, the processing moves to process 306 and the alarm 171 receives a control signal and the alarm sounds to indicate that the vehicle in front is starting to move.

Thus, by only pushing the congestion push-button 151a during the condition of stopping his vehicle due to congestion, the driver can take a rest, looking at a map, giving his eyes a rest and so on until the alarm is generated indicating that the vehicle in front has begun to move. The driver can reduce his mental and physical burdens considerably in such ways.

On the other hand, when the running push-button 151b of the command unit 151 is pushed during normal running to generate a command signal, the inter-vehicle distance data for safe driving is read out as reference distance information from the memory 111 and supplied to the comparator 112, then the data is compared with the detected inter-vehicle distance data output from the distance information sensor 121 and the result is output to the alarm 171. By providing an apparatus for operating an accelerator and a brake so as to keep the inter-vehicle distance equal to the value of the reference distance information instead of the alarm 171, an automatic tracking running control to keep a safe inter-vehicle distance with respect to a preceding vehicle can be realized. The standard value of the safety inter-vehicle distance for the automatic tracking can be determined based on the actual detected inter-vehicle distant data output from the distance information sensor 121 when the running push-button 151b is pushed. Further, it is preferable that said reference distance information during the automatic tracking running control operation changes depending on running speed.

Figure 6:
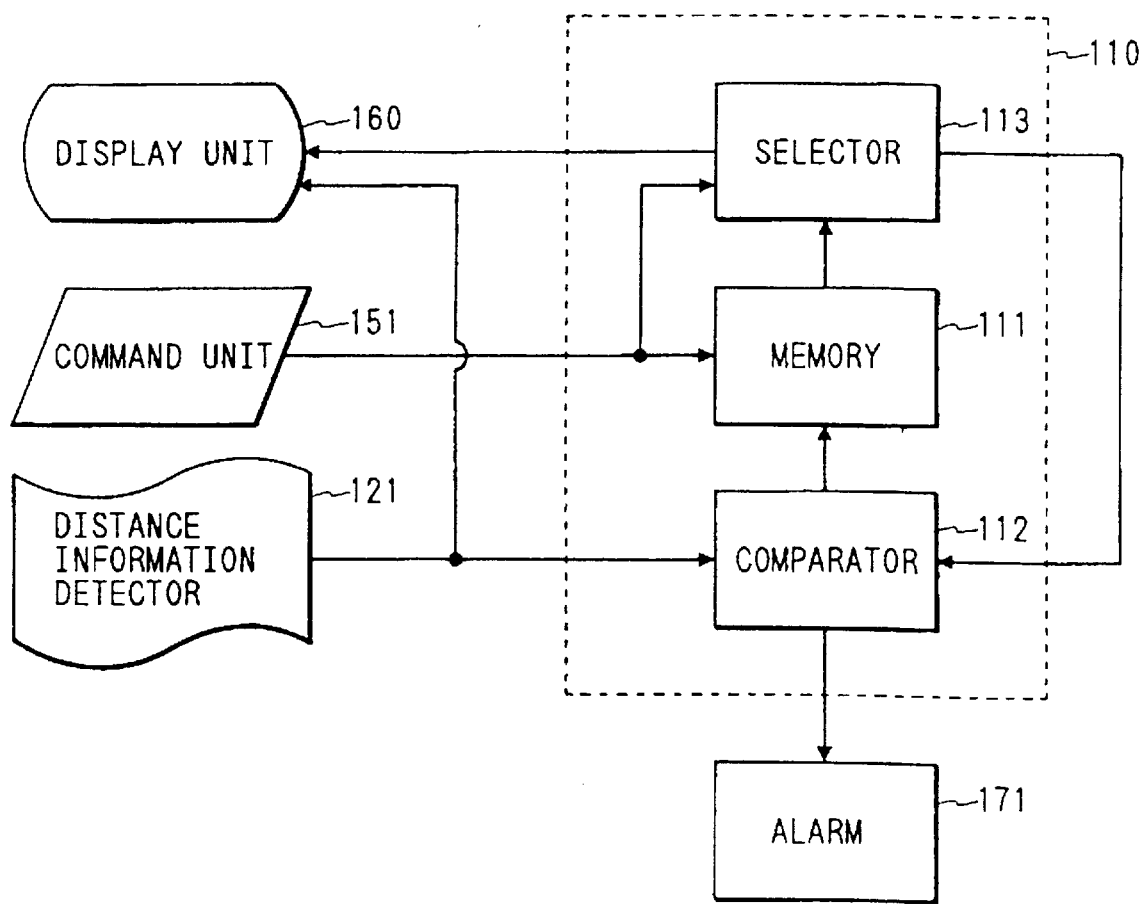
FIG. 6 is a block diagram showing the partial structure in another embodiment of a vehicle driving supporting system in accordance with the present invention.

FIG. 6 shows another embodiment of the partial structure of a vehicle driving support system in accordance with the present invention. In this figure, the same reference numbers are used for components having the same functions in the embodiment shown in FIG. 3. In this embodiment, a selector 113 is included in the information processing unit 110. The comparator 112 is different from that in FIG. 3 only to the extent that the comparator in this embodiment has a function to output the inter-vehicle distance information from the distance information detector 121 to the memory 111, and the reference distance information supplied to the comparator 112 is entered from the selector 113. Further, the display unit 161 displays data from both the distance information detector 121 and the selector 113.

Figure 7:
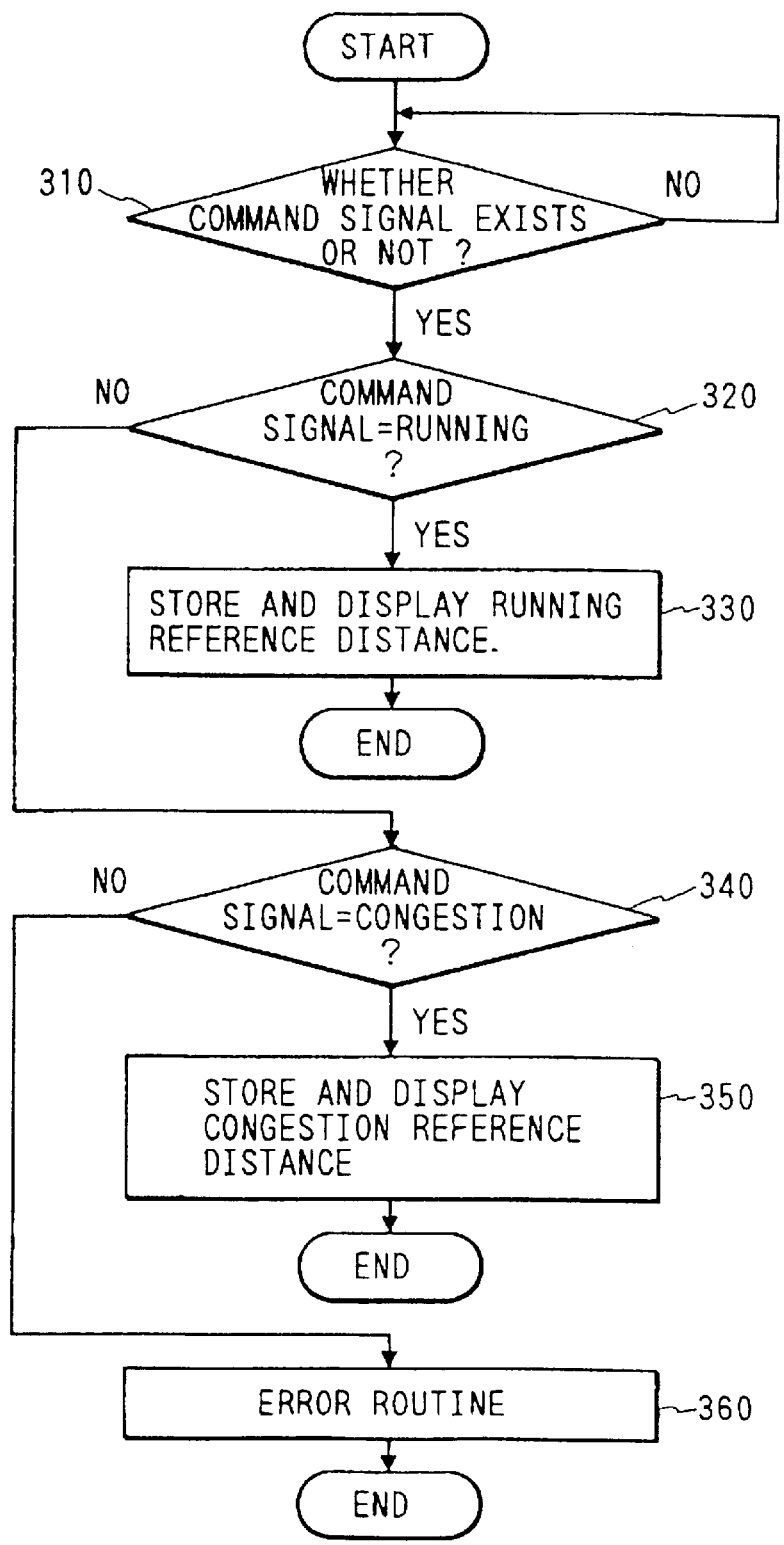
FIG. 7 is a flow diagram showing data processing executed by the information processing unit in the embodiment shown in FIG. 6.

Referring to FIG. 7, the operation of the embodiment of FIG. 6 will be explained.

In this embodiment, the information processing unit 110 analyzes the command signal from the command unit 151 to produce driving information suitable for the normal running condition or the congestion condition. When an improper signal is output from the command unit 151, it is processed as an error. In a case where the command unit 151 is of a type having push-buttons 151a and 151b, as shown in FIG. 4, an analysis on the command signal is carried out by discriminating the command signal generated by means of pushing the "congestion" or the "running" push-button. These buttons may be physical ones or dummy ones formed by using a graphic display and a touch panel.

In process 310, receipt of a command signal is monitored and the processing moves to process 320 when the signal is received. In process 320, an analysis is carried out on whether or not the command signal is generated by pushing the running push-button 151b. In a case where the command signal is generated by pushing the push-button 151b, the processing moves to process 330 and the running reference distance display process is executed.

Figure 8:
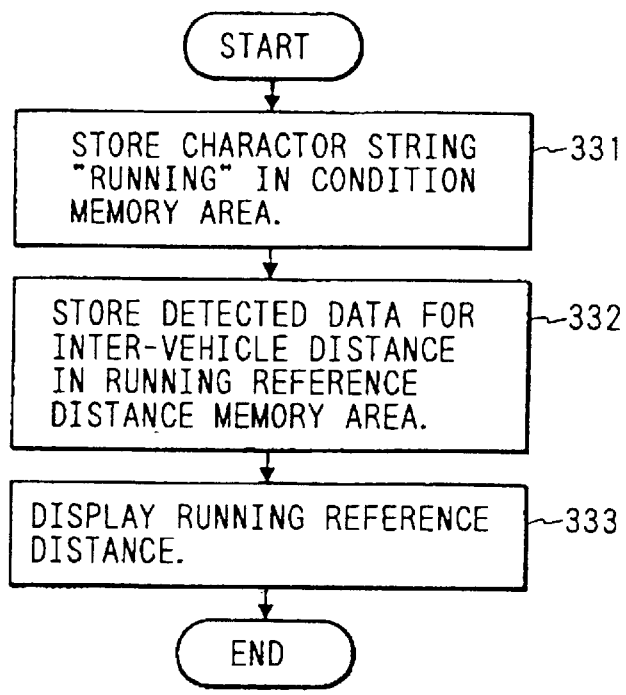
FIG. 8 is a flow diagram showing detailed data processing in the running reference distance display processing shown in FIG. 7.
Figure 10:
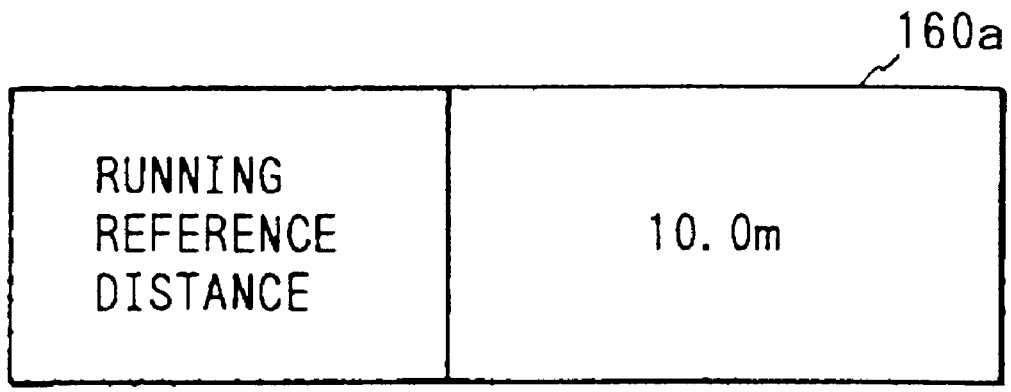
FIG. 10 shows a displayed picture on the display unit in the running reference distance display processing shown in FIG 8.

The running reference distance display process 330 in this embodiment has such steps, as shown in FIG. 8. In process 331 the character string "running" is stored in the condition memory area of the memory 111 as a labeling display message; in process 332 the detected inter-vehicle distance data received by the comparator 112 from the distance information sensor 121 is stored in the running reference information memory area of the memory 111 as reference distance information; and in process 333 both of the information are displayed on the display unit 160. An example of the displayed picture is shown in FIG. 10.

When the command signal is not generated by pushing the push-button 151b, the processing moves to process 340. In process 340, an analysis is carried out on whether or not the command signal is generated by pushing the congestion push-button 151a. In a case where the command signal is generated by pushing the congestion push-button 151a, the processing moves to process 350 and the congestion reference distance display process is executed.

Figure 9:
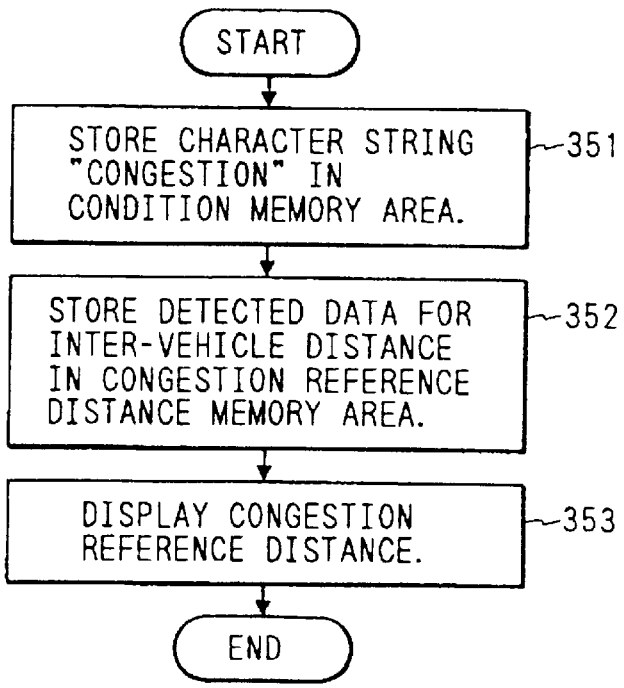
FIG. 9 is a flow diagram showing detailed data processing in the congestion reference distance display processing shown in FIG. 7.
Figure 11:
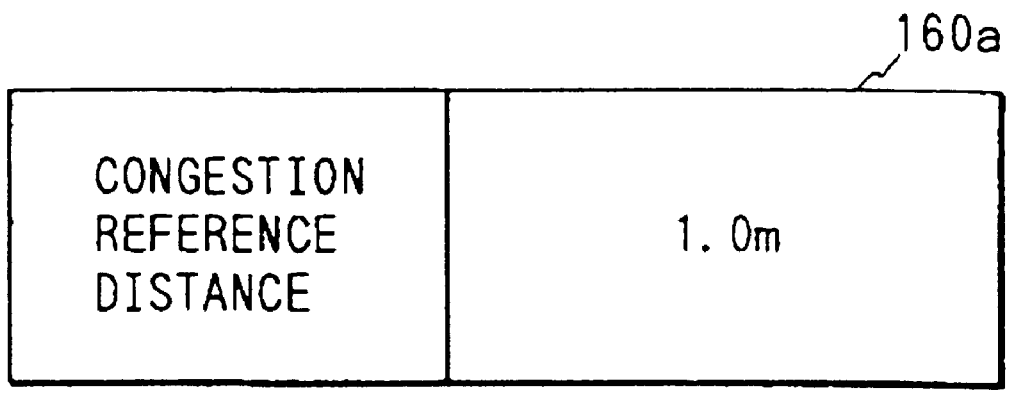
FIG. 11 shows a displayed picture on the display unit in the congestion reference distance display processing shown in FIG. 9.

The congestion reference distance display process 350 has such steps, as shown in FIG. 9. In process 351 the character string "congestion" is stored in the condition memory area of the memory 111 as a labeling display message; in process 352 the detected inter-vehicle distance data received by the comparator 112 from the distance information sensor 121 is stored in the congestion reference information memory area of the memory 111 as reference distance information; and in process 353 both of the information are displayed on the display unit 160. An example of the displayed picture is shown in FIG. 11.

Figure 12:
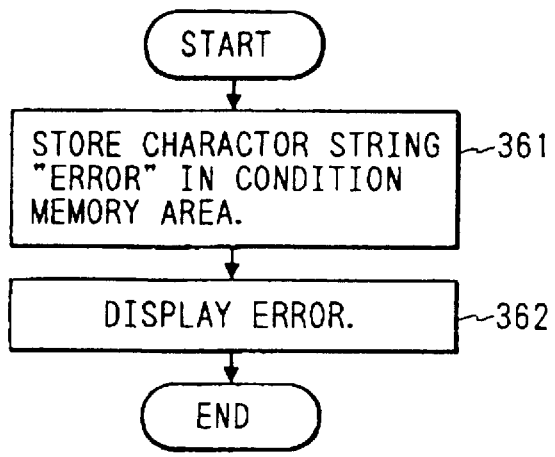
FIG. 12 is a flow diagram showing detailed data processing in the error routine shown in FIG. 7.
Figure 13:
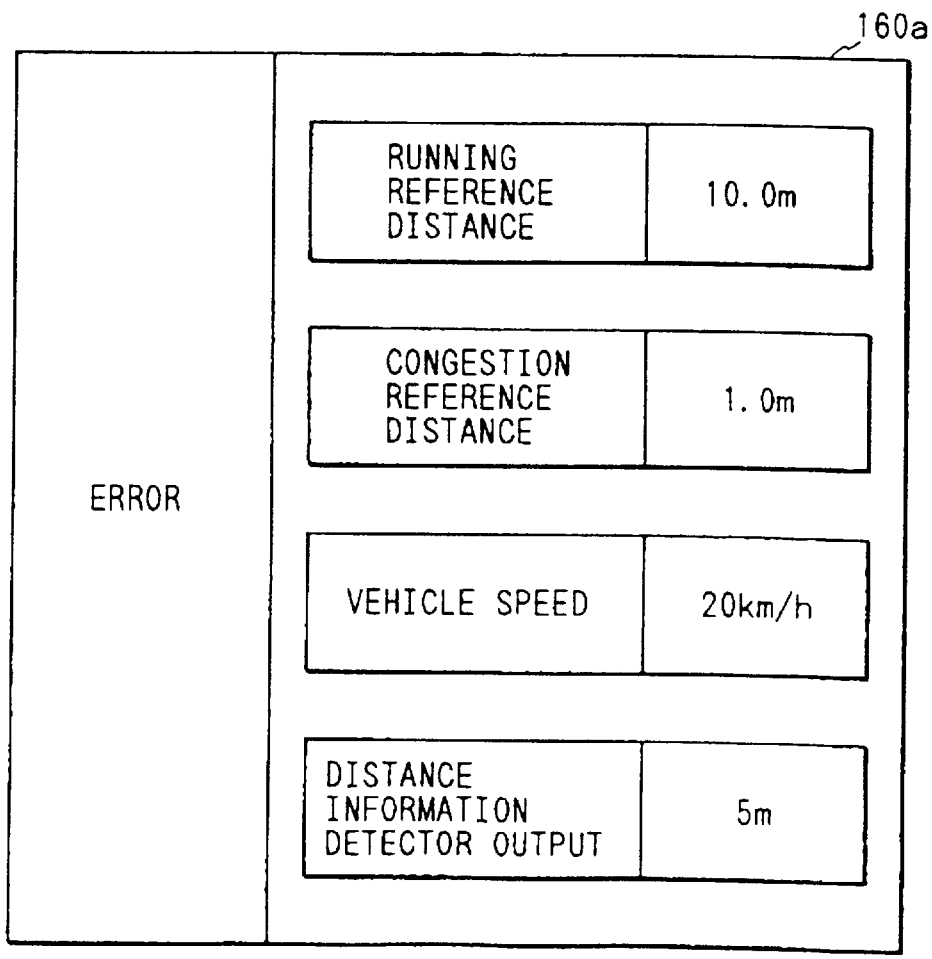
FIG. 13 shows a displayed picture on the display unit in the error routine shown in FIG. 12.

When the command signal is generated by neither the push-button 151a nor the push-button 151b, the processing moves to the error routine 360. The error routine 360 has such steps, as shown in FIG. 12. In process 361 the character string "error" is stored in the condition memory area of the memory 111 as a labeling display message, and in process 362 the information is displayed on the display unit 160. An example of the displayed picture is shown in FIG. 13.

Figures 14, 15:
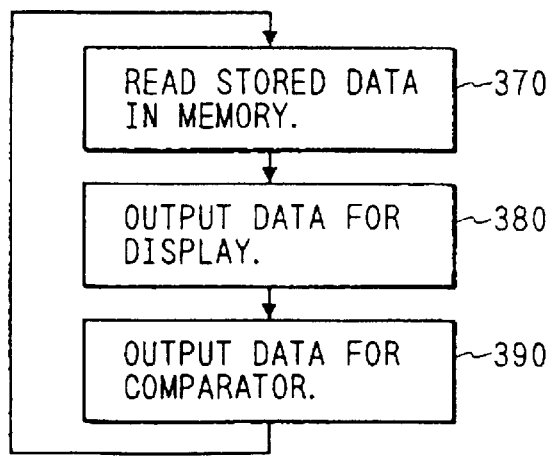
FIG. 14 shows one embodiment of an information memory format in the memory in the embodiment shown in FIG. 6.
FIG. 15 is a flow diagram showing data processing in the comparing reference distance information generating processing executed by the information processing unit in the embodiment shown in FIG. 6.

FIG. 14 shows an example of the stored data format within the memory 111 in the embodiment shown in FIG. 6. In the memory 111, the running reference distance, the congestion reference distance, the vehicle speed, and the output of the distance information detector 121 are stored in storage locations corresponding to their names. The vehicle speed data, therein, is entered to the memory 111 by branching off the signal transferred to an ordinary speed meter. The selector 113 generates the display information to be transferred to the display unit 160 and the comparing reference distance information to be transferred to the comparator 112 based on the stored data within the memory 111 shown in FIG. 14.

The comparator 113, as shown in FIG. 15, executes a data read out process 370 to read out data from the memory 111, as well as a display information output process 380 and a comparing reference distance information output process 390 to output the display information and the reference distance information.

Figure 16:
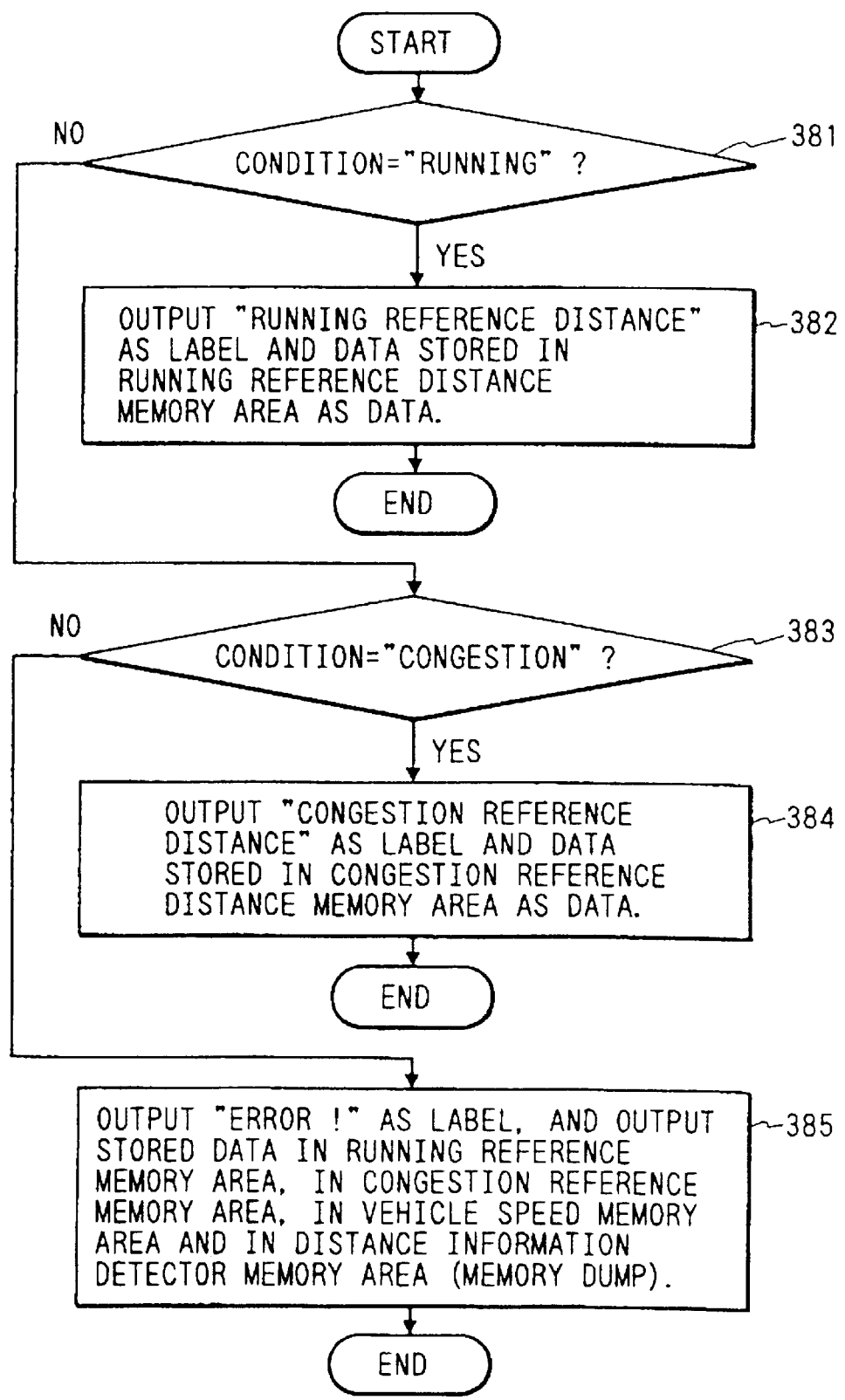
FIG. 16 is a flow diagram showing detailed data processing in the display information output processing in the comparing reference distance information generating processing shown in FIG. 15.

The display information output process 380 has such steps, as shown in FIG. 16. In process 381 an analysis is carried out on whether or not the command signal has been generated by pushing the running push-button 151b. In a case where the command signal is generated by pushing the running push-button 151b, the display information output process 382 is executed. And, in a case where the command signal is not generated by pushing the running push-button 151b, in process 383 an analysis is carried out on whether or not said command signal is generated by pushing the congestion push-button 151a. The display information output processing 384 is executed in a case where the command signal is generated by pushing the congestion push-button 151a. In a case where the command signal is generated by pushing neither the push-button 151a nor the push-button 151b, the display information output process 385 is executed.

Figure 17:
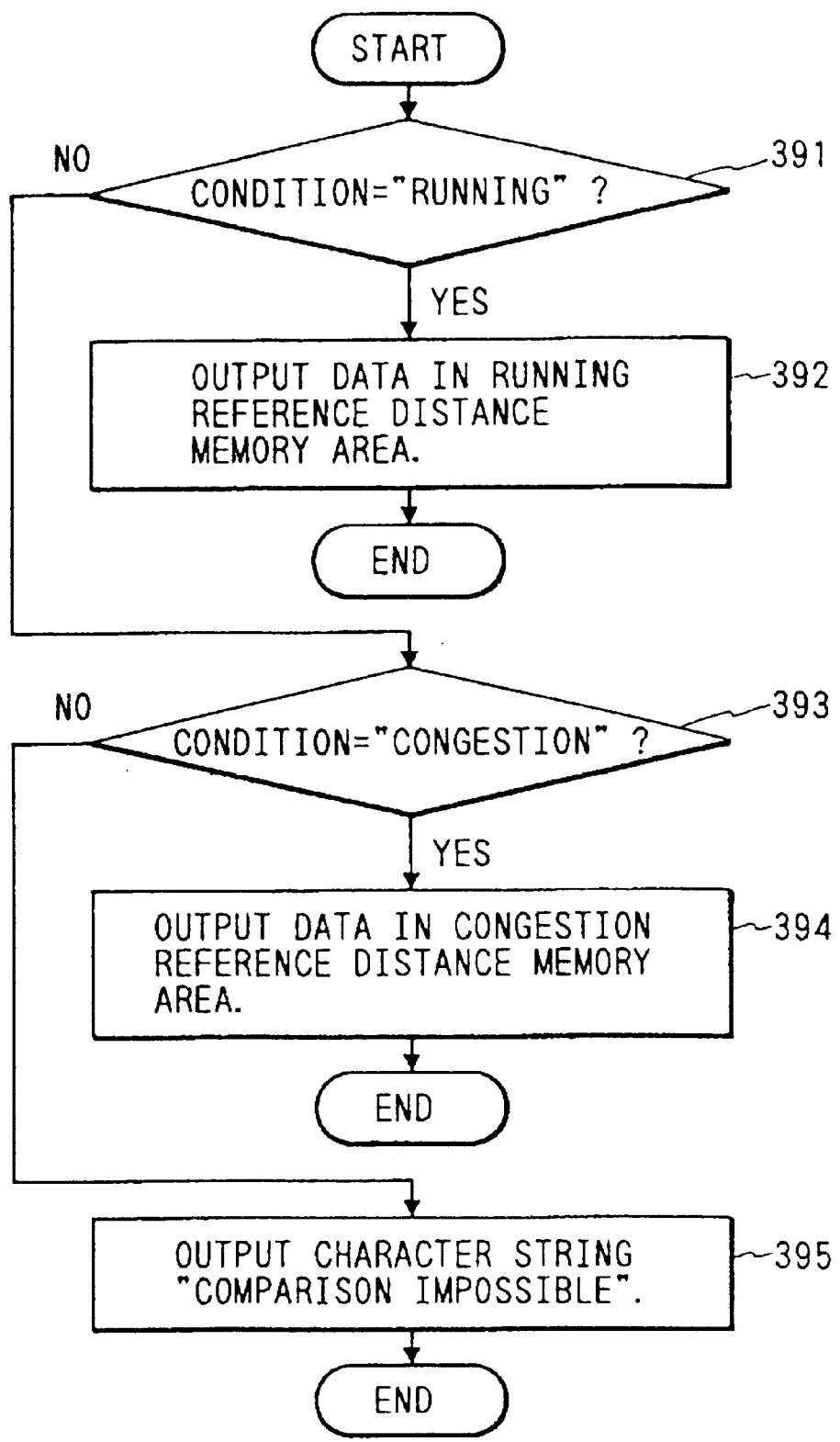
FIG. 17 is a flow diagram showing detailed data processing in the comparing reference distance information output processing in the comparing reference distance information generating processing shown in FIG. 15.

The comparing reference information output process 390 has such steps, as shown in FIG. 17. In process 391 an analysis is carried out on whether or not the command signal is generated by pushing the running push-button 151b. In a case where the command signal is generated by pushing the running push-button 151b, the comparing reference distance information output process 392 is executed. And, in a case where the command signal is not generated by pushing the running push-button 151b, in process 393 an analysis is carried out on whether or not said command signal has been generated by pushing the congestion push-button 151a. In a case where the command signal is generated by pushing the congestion push-button 151a, the comparing reference distance information output process 394 is executed. In a case where the command signal is generated by pushing neither the push-button 151a nor the push-button 151b, the process 395 is executed to output the character string "comparison impossible" as comparing reference distance information.

Figure 18:
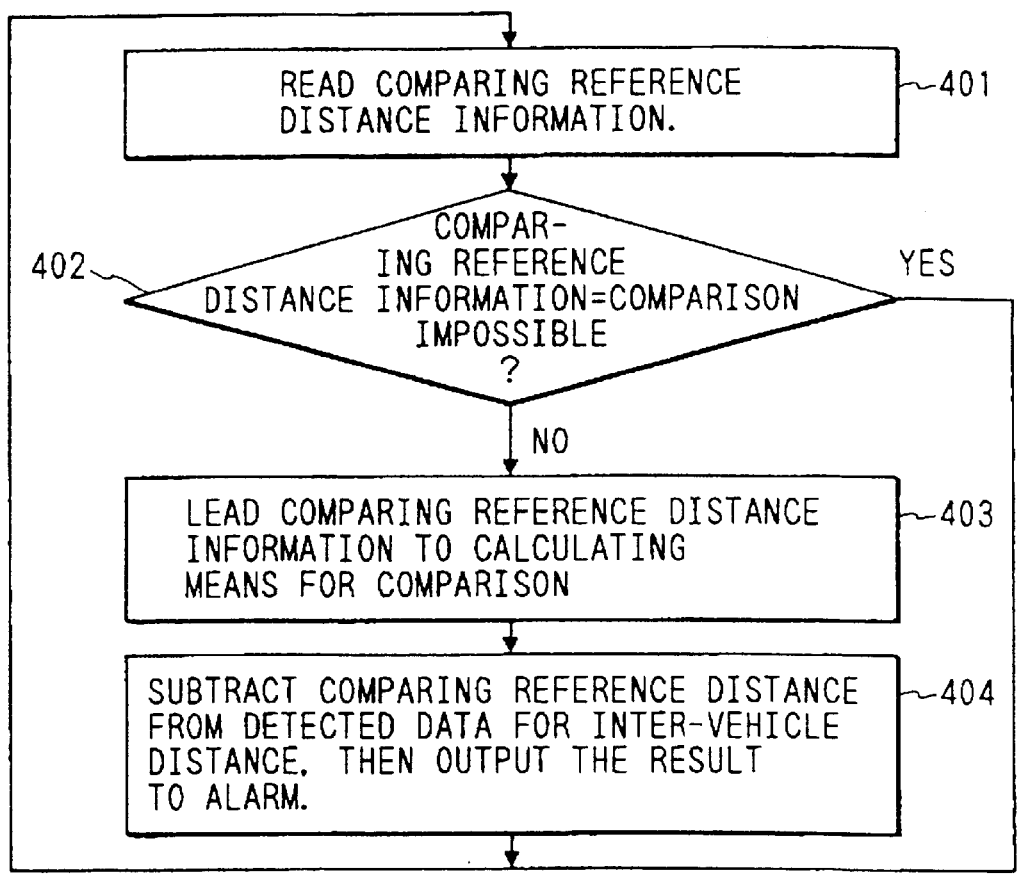
FIG. 18 is a flow diagram showing data processing in a comparing processing executed by the information processing unit in the embodiment shown in FIG. 6.

The comparator 112 in this embodiment executes the comparing process shown in FIG. 18. Firstly, in process 401 the comparing reference distance information output from the selector 113 is read out, and then in process 402 an analysis is carried out on whether or not the information is a characteristic string "comparison impossible". In a case where the information is not the characteristic string "comparison impossible", the processing moves to process 403 and said comparing reference distance information is input to the comparison calculating process. Next, in process 404 a measure comparing calculation processing is executed between the detected inter-vehicle distance data and said comparing reference distance information, and the result is output to the alarm 171.

Figure 19:
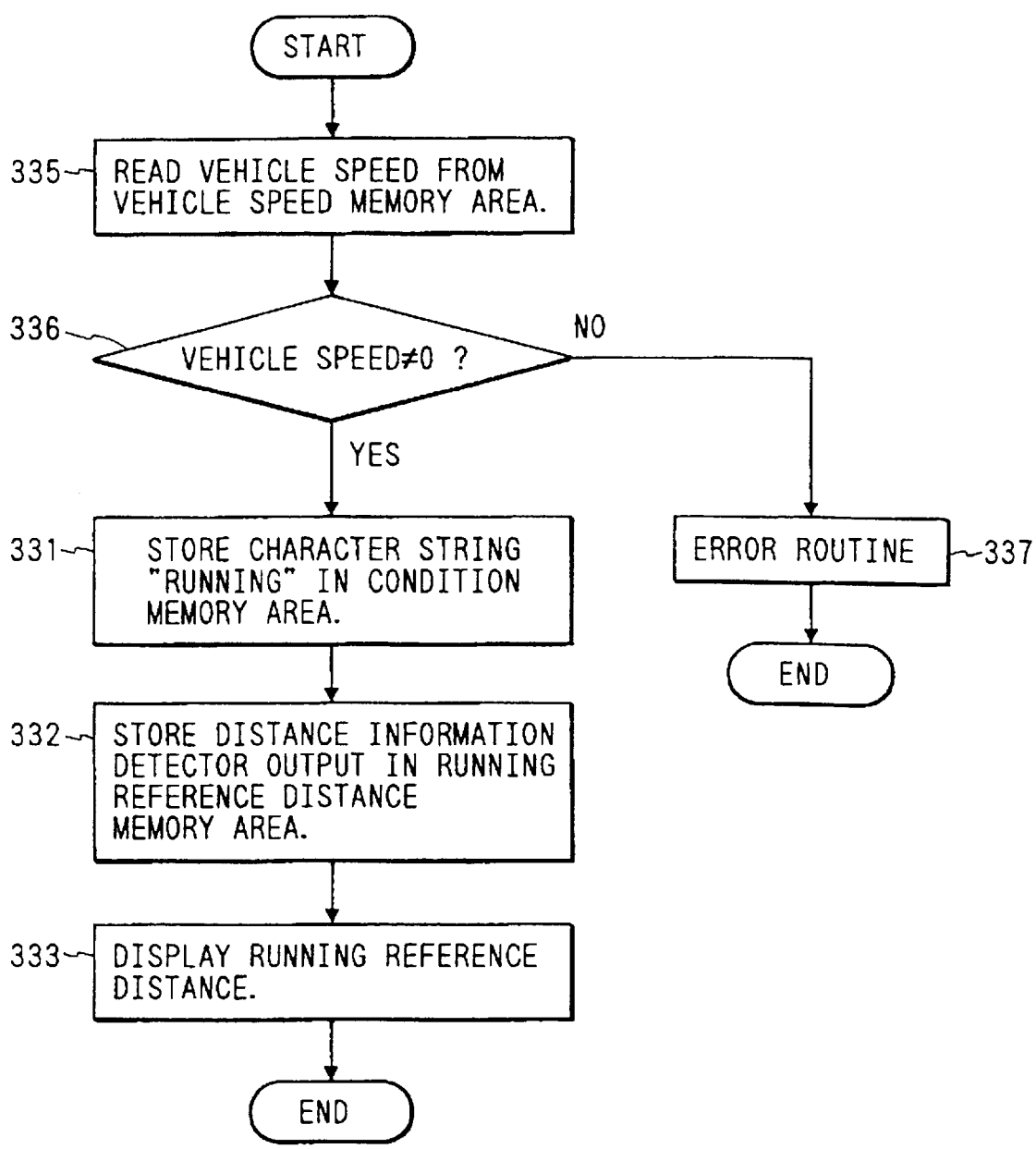
FIG. 19 is a flow diagram showing other detailed data processing in the running reference distance display processing shown in FIG. 7.

The running reference distance information process 330 described above can be modified as shown in FIG. 19. The modification has a function for checking whether or not any erroneous operation exists in the driver's button pushing action by referring to running speed information, and an error routine is executed when an error exists. That is, the modification has a process 335 for reading in vehicle speed data from the memory 111, a process 336 for analyzing whether or not the vehicle speed is equal to zero and an error routine 337 which is executed when the vehicle speed is zero.

Further, the congestion reference distance information process 350 described above can be modified as shown in FIG. 20. The modification also has a checking function to determine whether or not any erroneous operation exists in the driver's button pushing action by referring to running speed information, and the error routine is executed when an error exists. That is, the modification has a process 355 for reading in vehicle speed data from the memory 111, a process 356 for analyzing whether or not said vehicle speed is equal to zero and an error routine 357 which is executed when the vehicle speed is zero.

Both of the modifications have advantages in storing and displaying the reference distance while checking the compatibility between the driver's button pushing action and the actual running condition.

Figure 21:
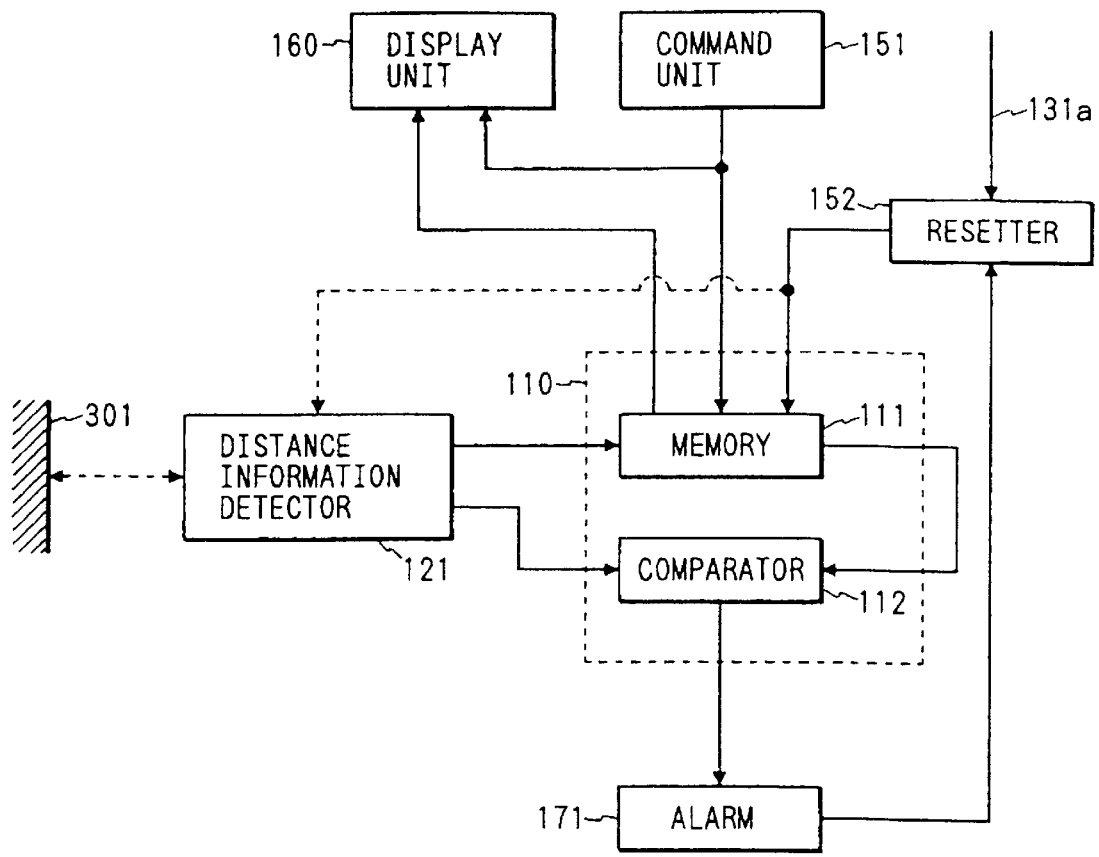
FIG. 21 is a block diagram showing a further embodiment of the partial structure of a vehicle driving support system in accordance with the present invention.

FIG. 21 shows one more embodiment of this invention, in which a resetter 152 is added to the embodiment shown in FIG. 3 to provide a more practical configuration. In FIG. 21, the same reference numbers in FIG. 3 are used for items having the same function. The resetter 152, forming a part of the commend input unit 150, generates a resetting signal in response to a command signal 131a actuated by the driver's button pushing action or accelerator pushing action or a signal generated by the output unit or alarm 171. The resetting signal stops the operation of the information processor 110 and, if necessary, the distance information detector 121. The resetter 152 generates the resetting signal instantaneously in reaction to the command signal generated by the push-button or the accelerator-pushing, and, on the other hand, operates to generate the resetting signal after a certain period in reaction to the signal generated by the alarm.

It is convenient for the reset button to be provided near the steering wheel along with the push-buttons described above.

Figure 22:
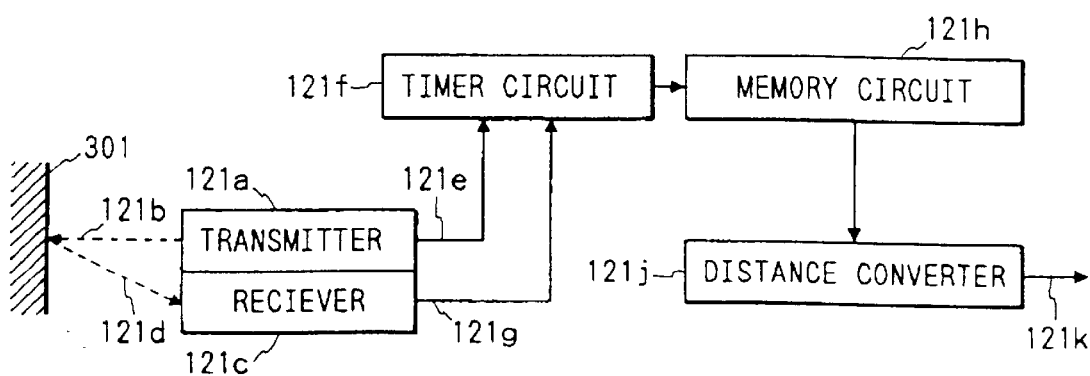
FIG. 22 is a block diagram showing the detailed structure of another embodiment of a distance information detector used in a vehicle driving support system in accordance with the present invention.

FIG. 22 shows a specific example of the distance information detector 121 used in the present invention. In this embodiment, the ultrasonic wave signal 121b from the transmitter 121a is beamed to the object 301. The reflection signal 121d is received by the receiver 121c. At this time, the timer circuit 121f is started in response to the signal 121e synchronized with the transmission of the ultrasonic wave signal 121b and is stopped in response to the signal 121g synchronized with receipt of the reflection signal 121d. With this, the ultrasonic wave round-trip time is measured with the timer circuit 121f. This measured time is transferred to the memory circuit 121h for storage and is converted to a distance signal in the distance converter 121j. In this case, usually, the distance converter 121j may be a converter having a coefficient multiplier corresponding to the relationship between the propagation time of ultrasonic wave and the propagation distance. The converter 121j outputs detected inter-vehicle distance data 121k, which represents a propagation distance having a propagation time of one-half of the measured time.

Instead of ultrasonic waves, a modulated optical signal may be used. In this case, the timer circuit 121f can be used as a phase detector to detect the phase difference between the emitted light and the received light.

Figure 23:
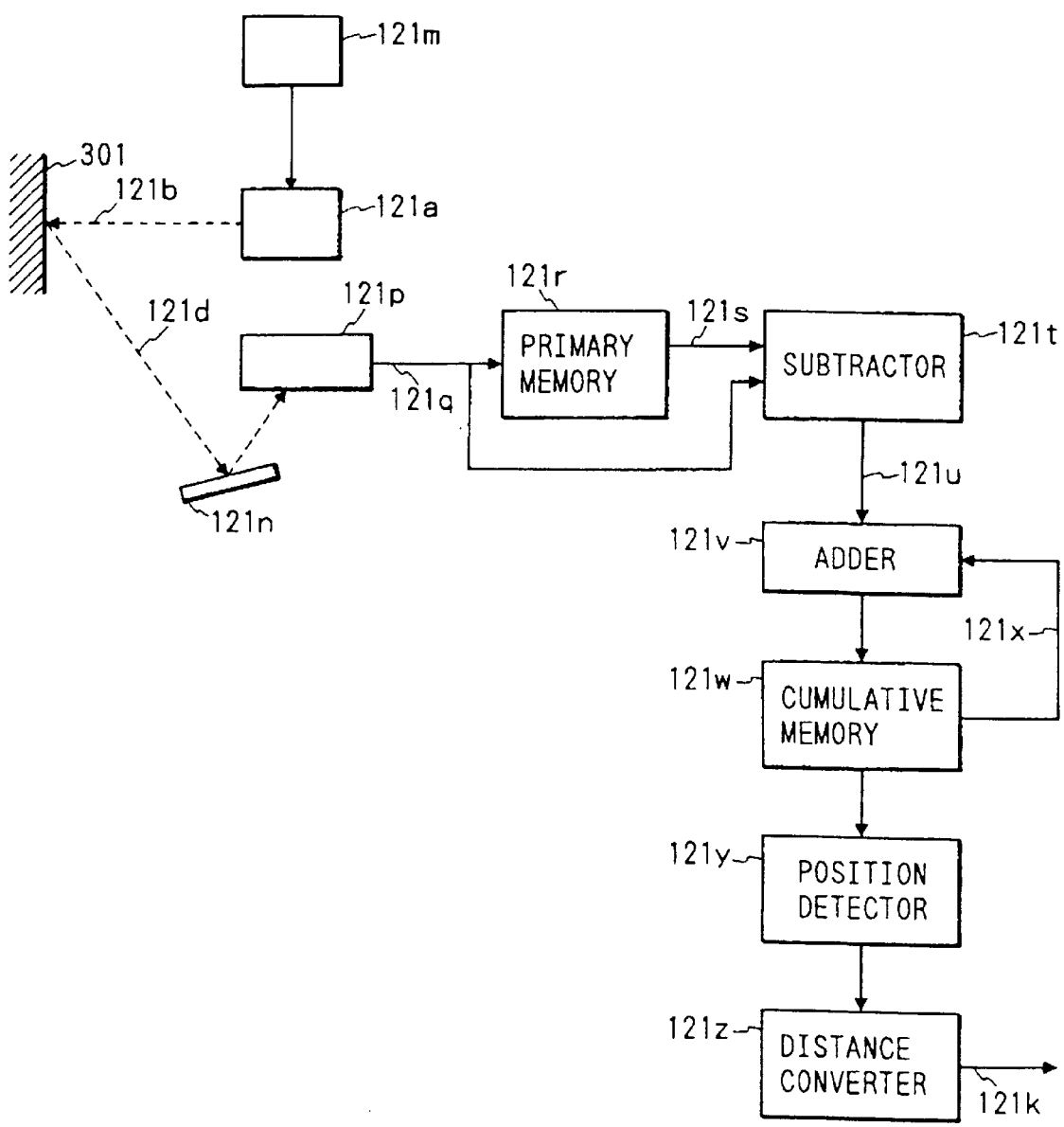
FIG. 23 is a block diagram showing the detailed structure of a further embodiment of a distance information detector used in a vehicle driving support system in accordance with the present invention.

FIG. 23 shows another form of the distance information detector 121 used in the present invention. In this embodiment, the ON-OFF signal generated by an ON-OFF controller 121m is used to control a laser beam 121t emitted from a laser emitter 121a. When the laser beam is ON, that is, when the spot laser beam is directed onto part of the object 301, the object 301 image is picked up by a camera unit 121p along a path 121d at an angle to that at which the laser beam has been emitted after reflection by a mirror 121n. The image signal 121q from the camera unit 121p is stored in a temporary memory 121r. When the laser beam is OFF, that is, when the spot laser beam is not emitted, the object 301 is picked up by the camera unit 121p in the same way, and the image signal 121q is supplied directly to a subtractor 121t and is subtracted from the image signal 121s stored in the temporary memory 121r. In this way, the complicated patterns peculiar to the object 301 offset each other. As a result, the difference signal 122u output from the subtracter 121t is assumed as an ideal signal which is brighter only in the portion corresponding to the small spot laser beam. In general, however, the signal noise level is weak and difficult to be identified. This is why the laser beam is turned ON/OFF repetitively, and the difference signal 121u of the image signal 121q obtained at the current ON/OFF cycle is added by adder 121v to the difference signal 121x integrated during a previous ON/OFF cycle and in a cumulative memory 121w, and then the result is re-stored into the cumulative memory 121w. The final difference signal stored in the cumulative memory 121w after it is turned ON/OFF repetitively for a specified number of times offsets noise in the image signal and is assumed as an image signal of a brighter spot laser beam. This image signal is read, its threshold value is processed in the position detector 121y, and the position corresponding to the spot laser beam in the image signal is detected. Then the value is assumed as the distance between the laser emitter 121a (distance information detector 121) and the object 301. Actually, since the direction of the laser beam emission differs from the direction of image picking-up, the position in the image signal is non-linear with the actual distance. Thus, the value may be converted in the distance converter 121z as needed. The output 121k is the detected inter-vehicle distance data. This kind of distance information detector is described more in detail in Japanese Patent Application Laid-Open No. 61-37563 (1986).

Figure 24:
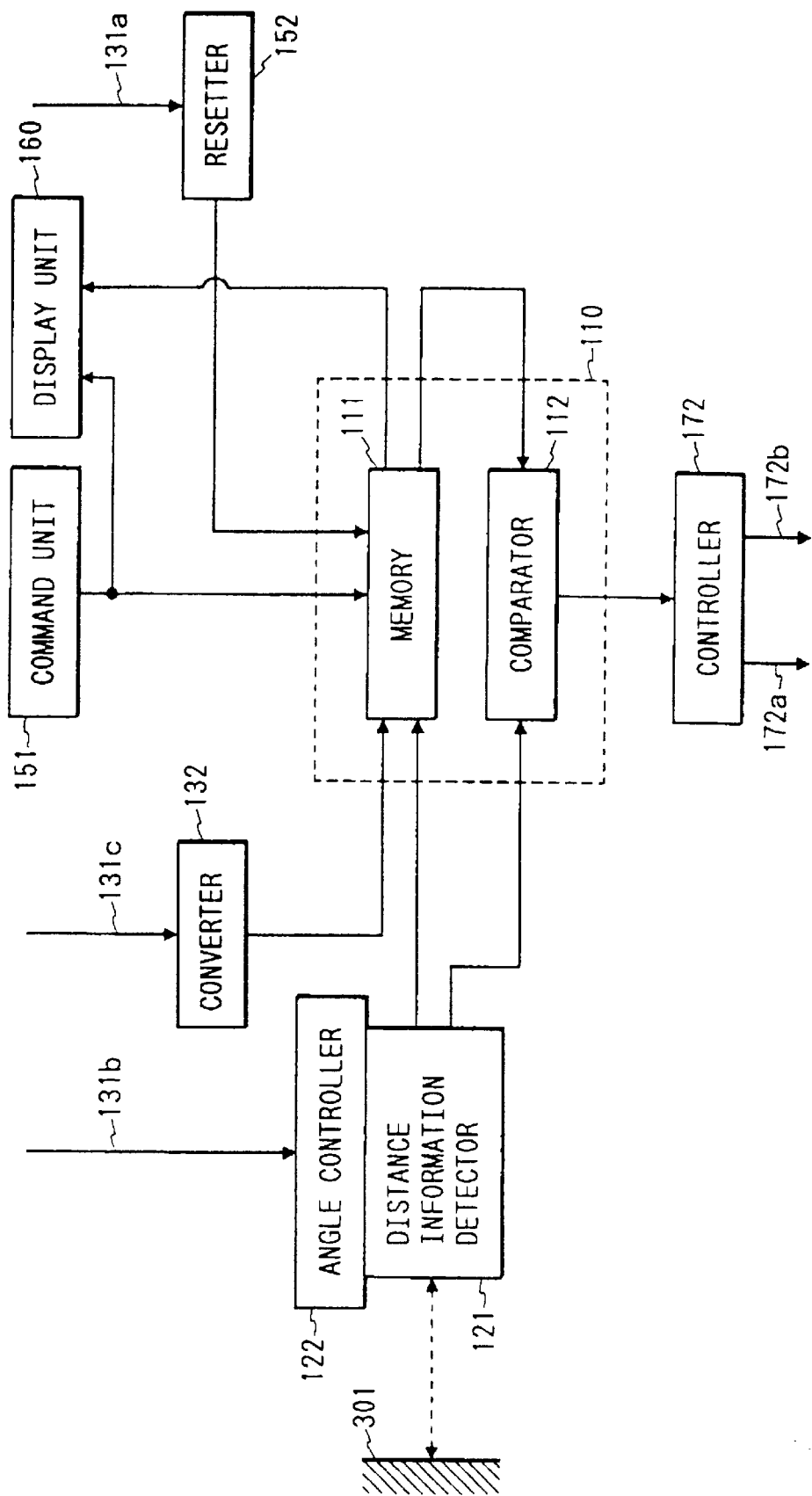
FIG. 24 is a block diagram showing a partial structure of a further embodiment of a vehicle driving support system in accordance with the present invention.

FIG. 24 shows the partial structure of a further embodiment of the vehicle driving support system in accordance with the present invention. In this figure, the same reference numbers are used in FIG. 1 for structural members having the same function. This embodiment shows an actual structure in which the relative positioning relation from the vehicle in front (inter-vehicle distance) is kept at the required value during normal running in order to make it possible for a subject vehicle to follow a preceding one. To drive a vehicle in such way is especially effective while driving on a highway, since it serves to reduce the driver's fatigue and thereby increases safety. When the driver attempts to follow a vehicle in front, the inter-vehicle distance to the preceding vehicle 301 is, as in the aforementioned embodiments, read out from the distance information detector 121 and stored into the memory 111 in the information processor 110 in accordance with the command signal given from the command unit 151, such as a start button. In this case, the distance information detector 121 can detect the inter-vehicle distance and output such distance information continuously or cyclically until the resetter 152 is actuated with the signal from the command unit 151. This can also be realized using the distance information detector 121 shown in FIGS. 22 and 23 when the detector 121 is started repetitively with the signal from the information processor 110. The detected inter-vehicle distance information measured and updated continuously is compared with the reference distance information preset and stored in the memory 111 in the comparator 112. Then, the difference between the detected signal and the set value is output to the control unit 172. In the control unit 172, the accelerator operating signal 172a and the brake operating signal 172b are output and used to automatically control the manipulated variable for the accelerating means or the braking means according to a difference signal of positive or negative value, respectively. These signals allow an automatic tracking of the preceding vehicle to keep the inter-vehicle distance from the preceding vehicle at a constant value.

To reset such automatic tracking driving mode, it is only necessary to step on the accelerator or the brake and reset occurs automatically. More particularly, the resetter 152 is actuated with the command signal 131a generated by stepping on the accelerator/brake and the operation resetting signal is transferred to the information processor 110.

When the subject vehicle comes to a curve during tracking driving, images from a camera unit, such as a TV camera provided optionally, are used to find the condition of the curve through image processing, for example, through analyzing the boundary or center line of the driving lane in order to control the target direction of the distance information detector 121 to be able to follow the preceding vehicle. The position of the preceding vehicle within its image can be recognized through image processing and the target of the distance information detector 121 can be controlled in that direction. In this embodiment, a simpler method is used. In this method, the vehicle steering wheel angle signal 131b detectable by a simple angle detector is used to drive the angle controller 122 and control the target direction of the distance information detector 121 provided in the controller 122 in order to hold the direction of the preceding vehicle approximately. In this case, normal driving is assured even when the distance information detector fails in catching the preceding vehicle in the target direction and the detected distance information data measured is changed abruptly. Also, the controller 172 generates alarm sounds to call a driver's attention to the situation and maintains the speed at a fixed value for a while until the preceding vehicle is detected again. Such processing can be realized easily, for example, with the information processor 110 comprising a microprocessor.

In a case where a vehicle running in front increases or decreases its speed, the vehicle has to be followed at a proper inter-vehicle distance corresponding to that speed. In such a case, it is only necessary to find the proper reference inter-vehicle distance from the subject vehicle speed signal 131c using the converter 132 to update the data in the memory 111. The converter 132 input/output is shown by the curve C in FIG. 25. It can be realized easily using, for example, a microprocessor and a memory circuit, which are combined into a function generator to generate a function that passes the point A in the Figure, indicating the set speed v and the inter-vehicle distance d at that time, and the point B, indicating the desired inter-vehicle distance b when the speed is 0, that is, when the vehicle stops. To realize this function with the simplest straight line, the relationship between the inter-vehicle distance D and the speed V will be expressed as the following equation.

$$D = (d-b)/v \times V + b \qquad \text{(Equation 1)}$$

Thus, it is only needed that the converter 122 is an arithmetic unit to calculate the proper inter-vehicle distance D corresponding to the speed V based on this equation. In this case, when the inter-vehicle distance b at the zero-speed is 5 m, then the inter-vehicle distance can be secured properly and the subject vehicle can stop with a final inter-vehicle distance of 5 m when the vehicle in front decreases its speed and stops.

When the driver commands a tracking driving during running at a speed of v and the inter-vehicle distance d from a vehicle in front is excessively smaller than that called for at the speed v, then the tracking driving is dangerous. In other words, it may be dangerous when the function passes the point A (v, d) shown in FIG. 25. In such a case, a standard function $C_0$ can also be used together to shift over into a tracking driving while keeping a safe distance. In other words, the values d and $d_0$ (see FIG. 25) of both the function C and the function $C_0$ output from the converter 132 are transferred to the information processor 110. Then, the preset inter-vehicle distance value d in the memory 111, which is initially set based on the output value of the function C, is updated to the distance do based on the function $C_0$ gradually at certain inter-vehicle distances through intermediate values between C and $C_0$, and finally is converted to the set inter-vehicle distance value $d_0$ of the function $C_0$. A processing like this can be executed easily by an information processor 110 comprising a microprocessor. Thus, the subject vehicle is separated by a safe inter-vehicle distance from the preceding vehicle, and finally the subject vehicle can go into a tracking driving maode while keeping a safe inter-vehicle distance.

Figure 26:
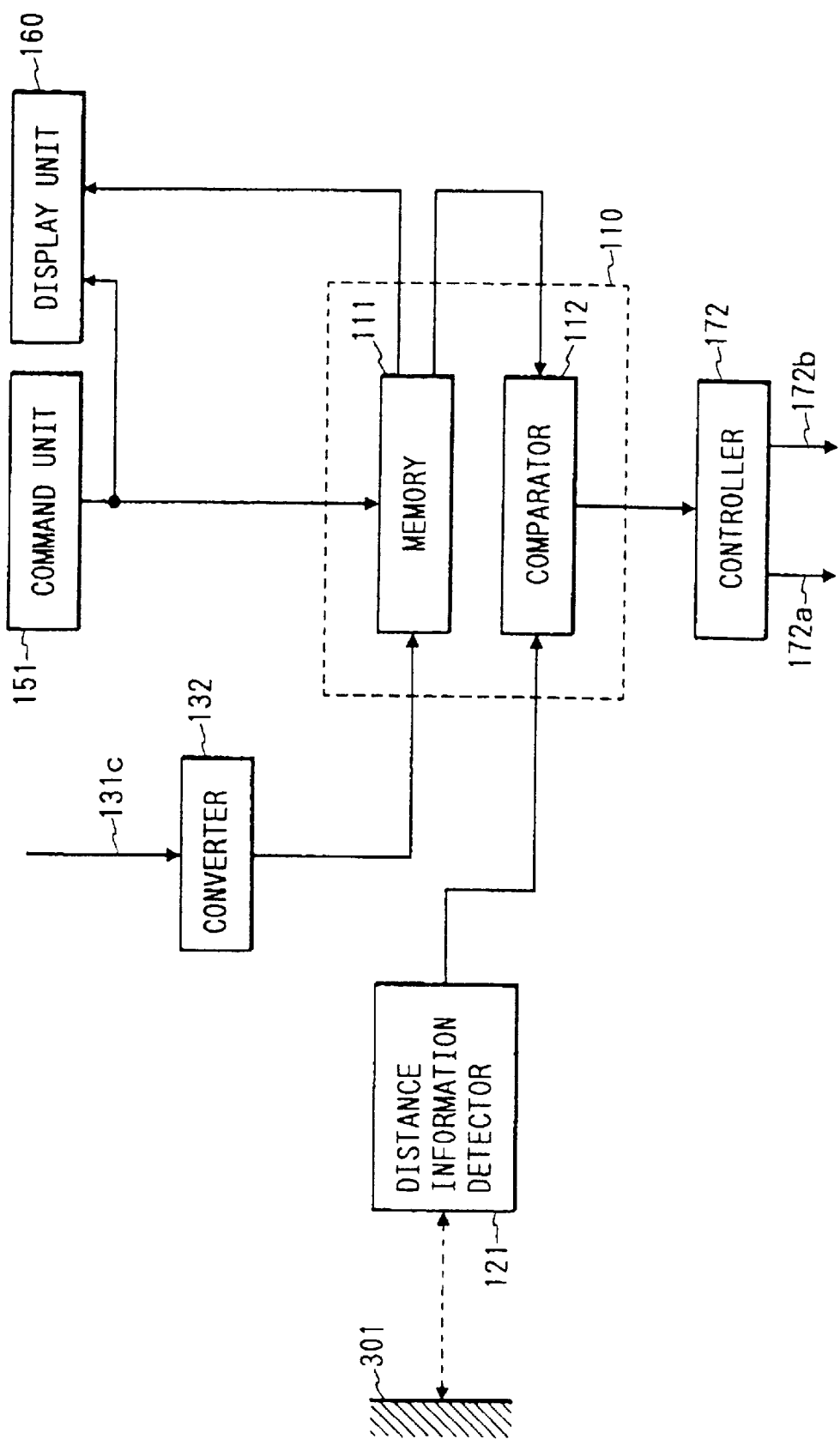
FIG. 26 is a block diagram showing the structure of an embodiment of a vehicle driving support system suitably applicable to an unmanned vehicle in accordance with the present invention.

On the other hand, the vehicle driving support system in accordance with the present invention can be applied even to a vehicle that runs on a specific railway with no modification or with slight modifications. In this case, the vehicle may be a manned railway vehicle, an unmanned railway vehicle, and an unmanned auto carrier (robot) that runs in factory premises. FIG. 26 shows the structure of an embodiment in accordance with the present invention, which can be applied to such unmanned driving of vehicles.

Figure 25:
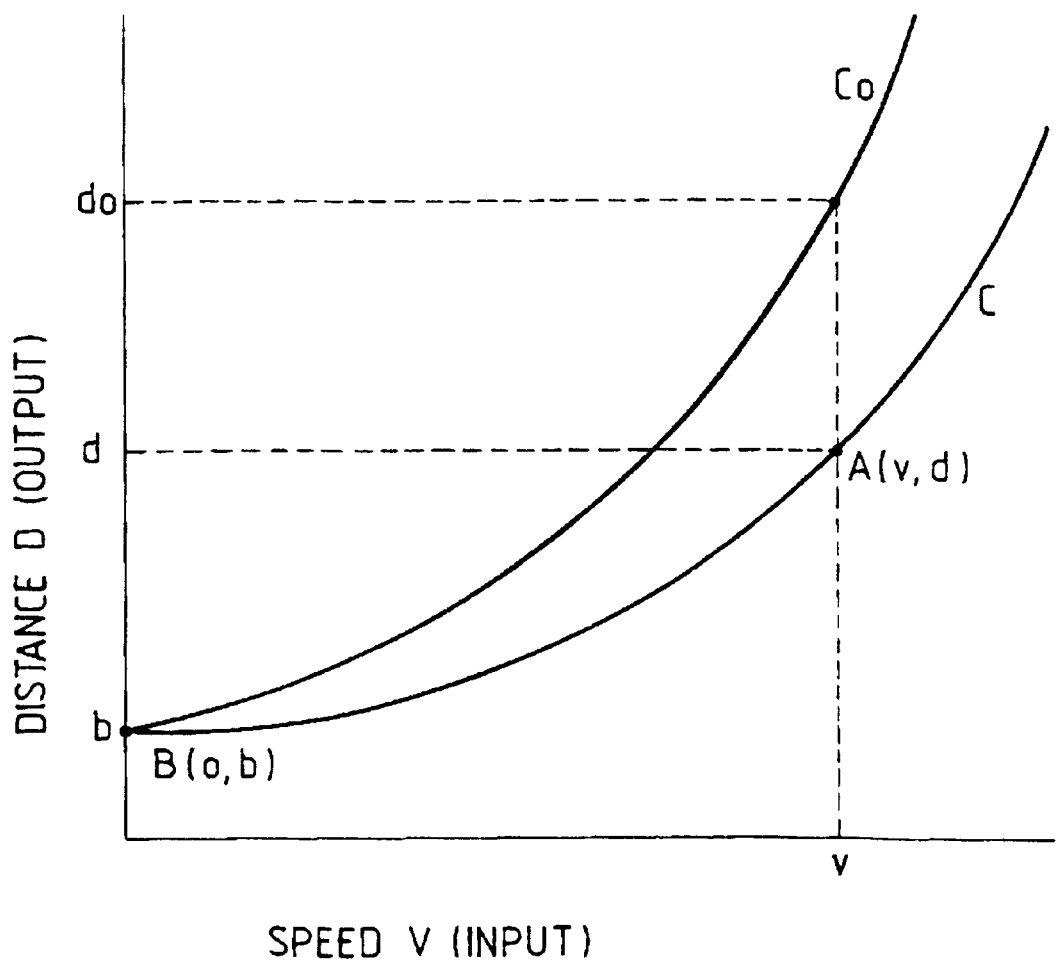
FIG. 25 is a graph showing a conversion characteristic of a converter in the vehicle driving support system in accordance with the present invention shown in FIG. 24.

In this embodiment, the distance information detector 121 may be an indirect distance measuring instrument, such as a distance calculator of the type used to measure the distance between subject and preceding vehicles according to the position signals of both the subject and preceding vehicles to be transferred via the operation control center of the subject railway or unmanned carrier system. The distance between both the vehicles is not measured directly at this time. The reference distance information is not obtained through a process which requires a driver's start command and the distance information from the distance information detector 121 is not input into the memory 111; rather, the reference distance information is obtained through approaches in which, in response to the command from the command unit 151 the distance information is sent from the operation control center and stored into the memory 111 as fixed reference distance information, or at the start of the system operation, fixed distance information is directly set in the memory 111 from the command unit 151. Especially, in a case of an unmanned vehicle, it would be convenient to use the preset fixed distance information. The inter-vehicle distance from the preceding vehicle, which is measured directly or calculated indirectly, is updated with time and compared with the preset reference distance information in the memory 111 by the comparator 112, and the differential signal is output to the controller 172. The controller 172 outputs the accelerator operation signal, that is, the accelerating signal 172a and the brake operation signal, that is, the speed reduction signal 172b according to whether the differential signal is positive or negative. When the inter-vehicle distance from the vehicle in front is decreased, the subject vehicle speed is also decreased. The reference inter-vehicle distance information preset in the memory 111 is automatically updated so as to be decreased by the converter 132 according to the speed reduction established by the function as shown in FIG. 25. As a result, the speed reduction in this case does not occur abruptly, but is performed smoothly. When the preceding vehicle stops at this time, the subject vehicle also stops at the required stop interval b. When the vehicle in front begins to move, the interval is also increased. Thus, the subject vehicle begins to follow the preceding vehicle. As the inter-vehicle distance with the preceding vehicle is increased, the subject vehicle is accelerated. In such a way, as the vehicle speed is increased, the set value in the memory 111 is increased according to the signal from the converter 132. The tracking driving is thus carried out at a specific inter-vehicle distance which is longer than that when the subject vehicle stops.

Figure 27:
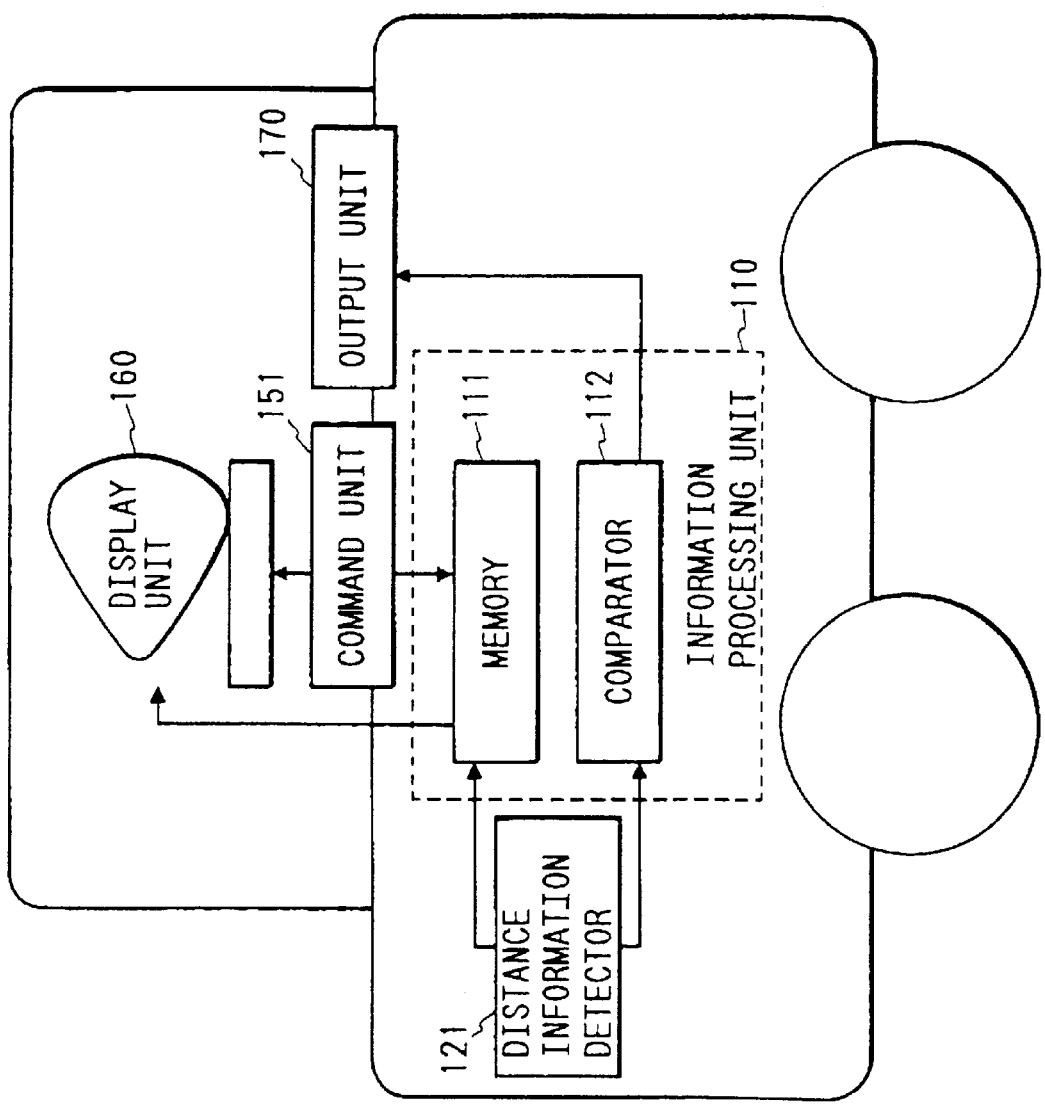
FIG. 27 shows a desirable configuration of the structural means of a vehicle driving support system in accordance with the present invention mounted on a vehicle.

FIG. 27 shows a desirable configuration of an embodiment of the structural arrangement for mounting a vehicle driving support system in accordance with the present invention onto a vehicle. In this embodiment, the distance information detector 121 is provided on the front of the subject vehicle. The display unit 160, the command unit 151, and the output unit 170 are provided near the driver's seat. Therewith, the commanding operation is easily carried out and alarms can be surely indicated to the driver.

Figure 28:
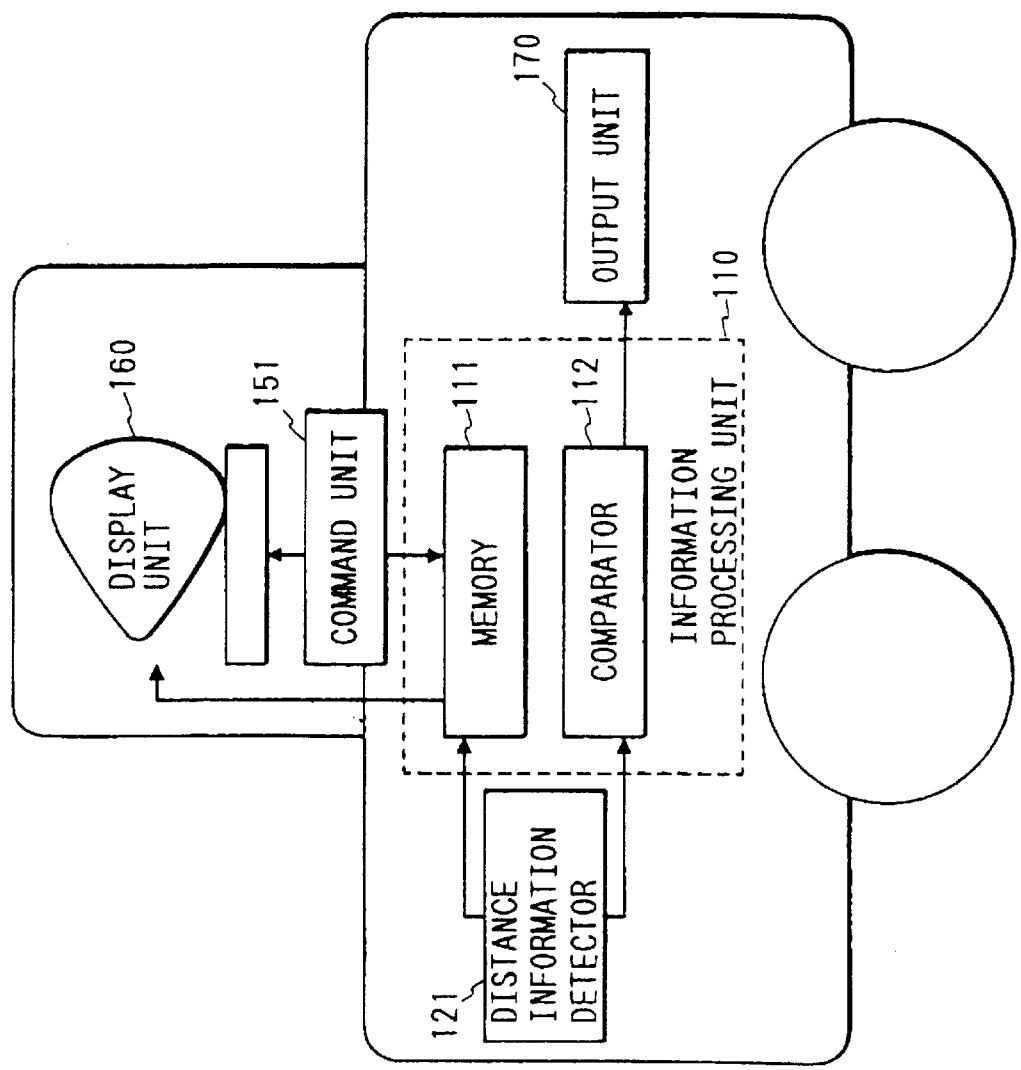
FIG. 28 shows another configuration of a driving support system in accordance with the present invention mounted on a vehicle.

FIG. 28 shows another embodiment of a vehicle driving support system in accordance with the present invention for mounting onto a vehicle. In this embodiment, the output unit 170 is provided near the vehicle controller (not shown). This allows simplifying the structure for automatic driving control.

Figure 29:
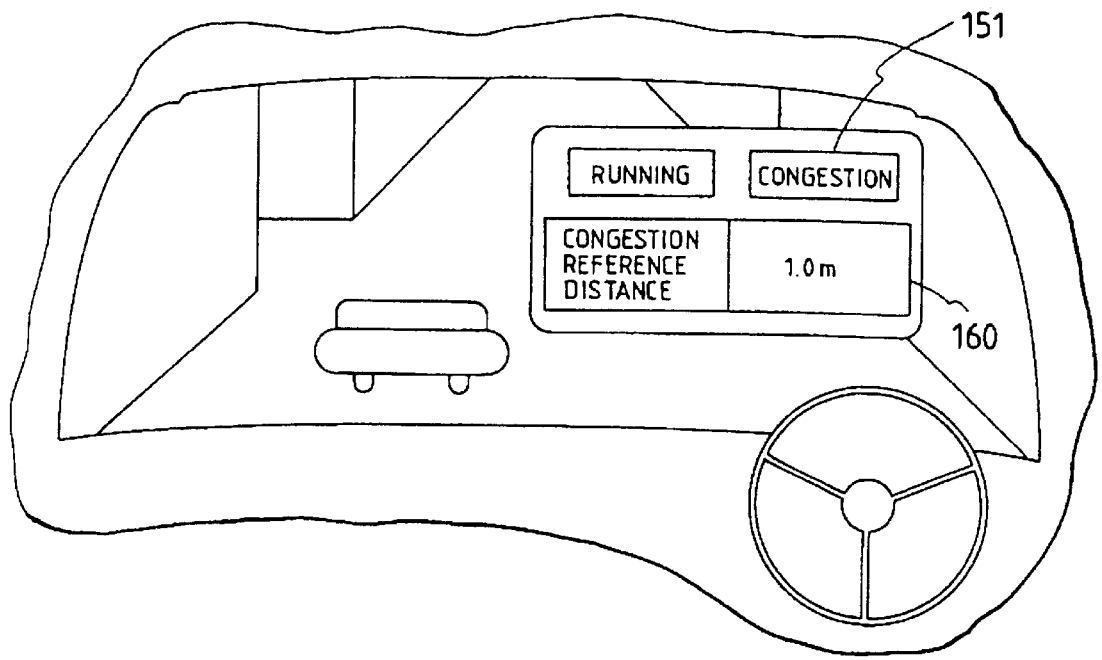
FIG. 29 shows a configuration of a command unit and a display unit forming a driving support system in accordance with the present invention.

FIG. 29 shows a further embodiment of a vehicle driving support system in accordance with the present invention for mounting onto a vehicle. In this embodiment, the command unit 151 and the display unit 160 are formed as a head-up display with a touch-panel to display the images on the windshield.

Figure 30:
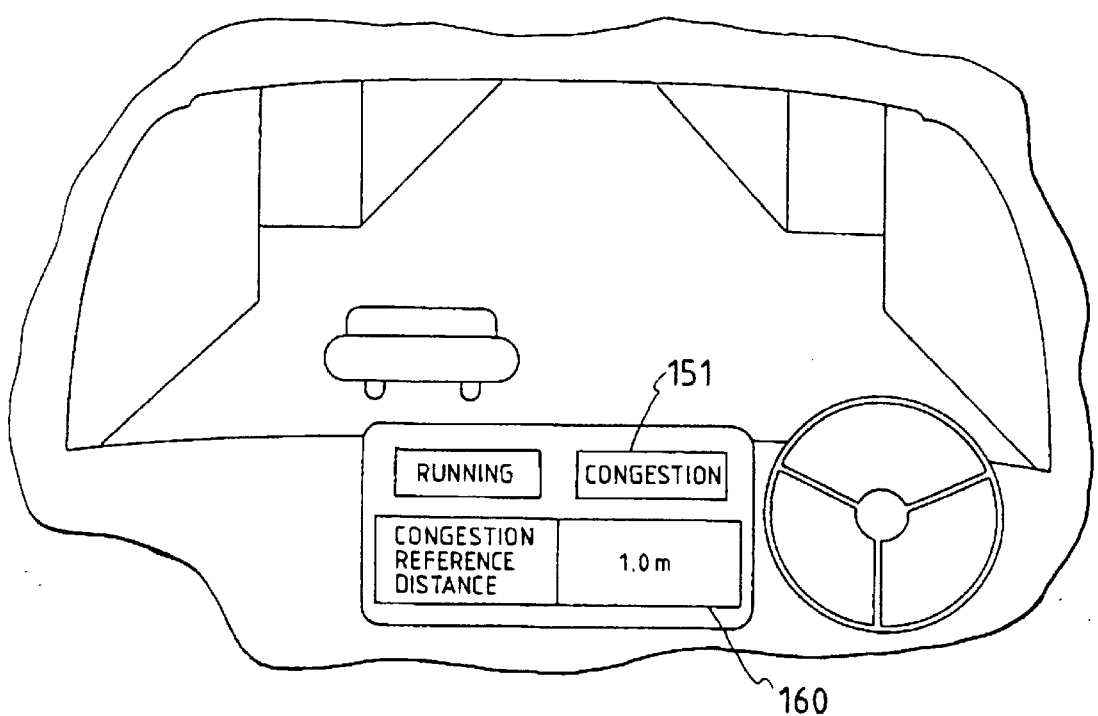
FIG. 30 shows another configuration of a command unit and a display unit forming a driving support system in accordance with the present invention.
Figure 31:
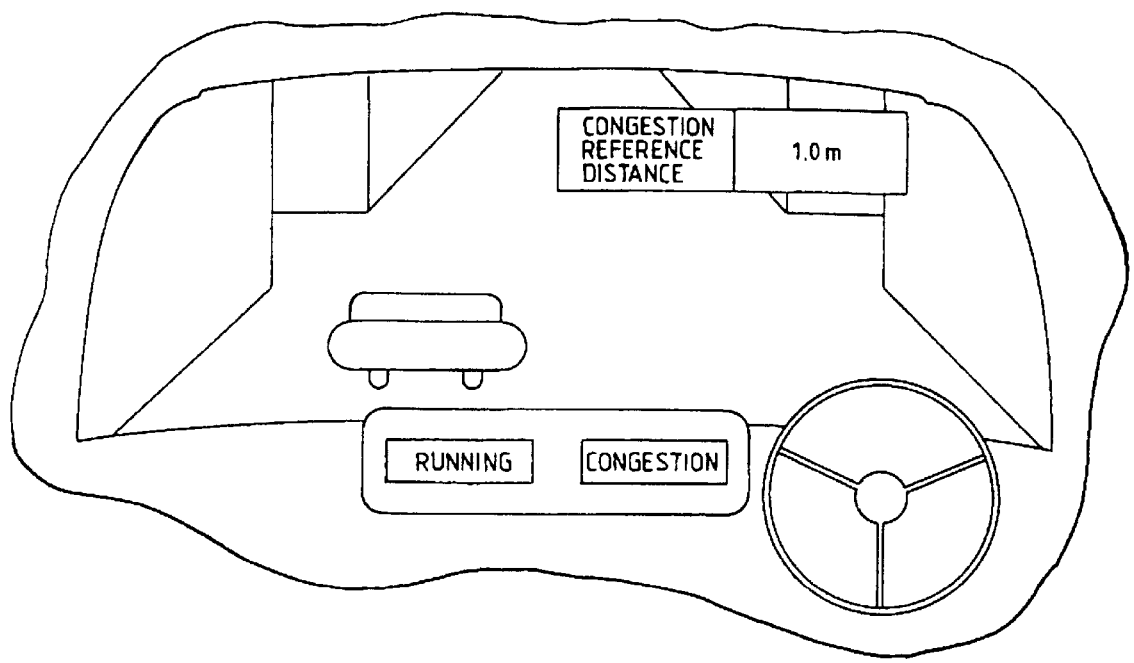
FIG. 31 shows a further configuration of a command unit and a display unit forming a driving support system in accordance with the present invention.

FIG. 30 and FIG. 31 show other embodiments of the command unit 151 and the display unit 160 in accordance with the present invention mounting onto a vehicle. In FIG. 30, the command unit 151 and the display unit 160 are provided on the dashboard. In FIG. 31, the command unit 151 is provided on the dashboard and the display unit 160 is provided as a head-up display.

Figure 20:
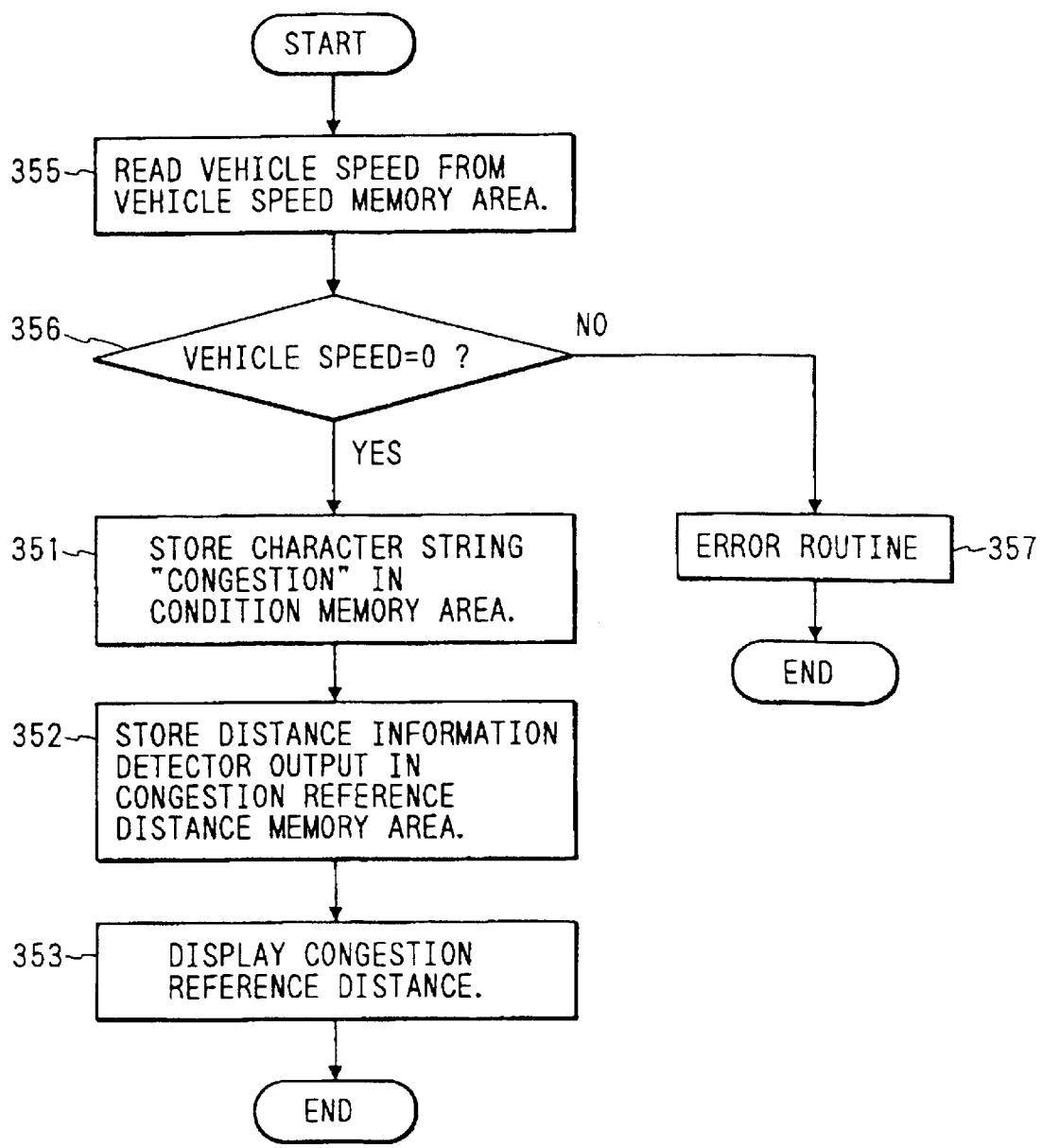
FIG. 20 is a flow diagram showing other detailed data processing in the congestion reference distance display processing shown in FIG. 7.

On the other hand, the vehicle driving support system in accordance with the present invention can also be used for controlling the rendezvous of moving bodies, such as artificial satellites. In other words, when a satellite draws near an adjacent satellite so as to be linked thereto, the curve $C_1$ or a straight line that passes the origin 0, as shown in FIG. 20, is used instead of the input characteristic C of the converter 132 shown in FIG. 25. In this case, as the speed is decreased, the interval between those satellites is set smaller, getting close to 0 gradually. This makes the rendezvous possible with no shock.

Figure 32:
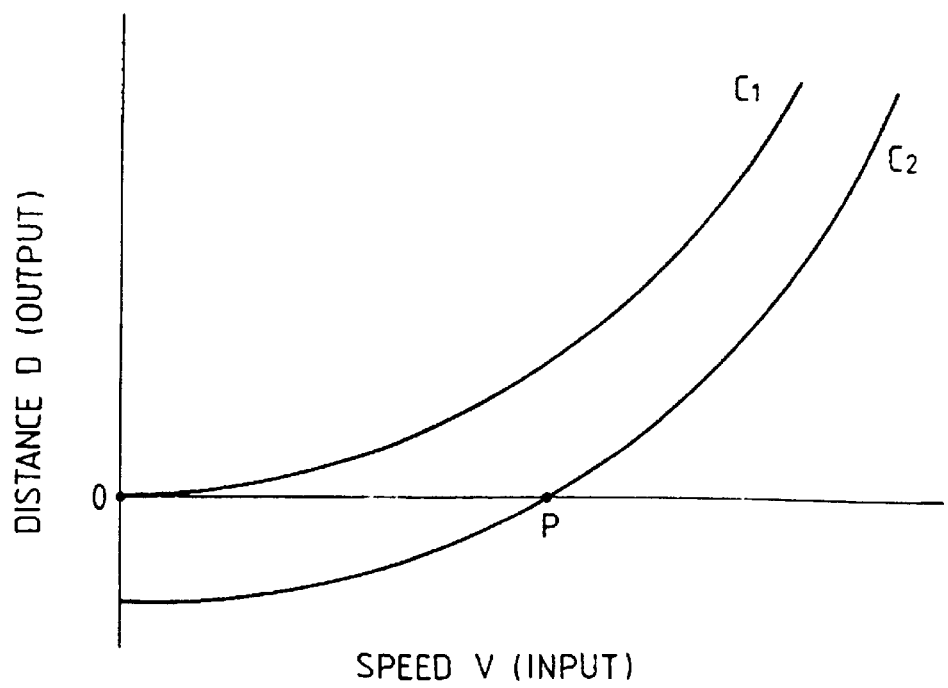
FIG. 32 is a graph showing another converting characteristic of a converter used in a vehicle driving support system in accordance with the present invention.

The vehicle driving support system in accordance with the present invention can also be used for a flying body like a missile. To use the vehicle driving support system in order to hit a target at a required speed, the curve $C_2$ or a straight line that passes the horizontal axis at the point P as shown in FIG. 32 may be used. At this time, when the distance to the target becomes 0, the speed, that is, the speed at the point P reaches the required speed of collision.

Since, according to the present invention, more vehicles can be allocated on a road or railway than in the conventional method, a high density and high efficiency driving control can be realized. For this purpose, a more useful system may be structured especially for a railway in an overcrowded city, such as a loop railway system.

As explained above, the vehicle driving support system can monitor the restarting of the preceding vehicle during stopping of the vehicle, which would ease the tension of the driver in traffic congestion. During running, the driver can follow the preceding vehicle while keeping a proper distance from the preceding vehicle, which would assure the driver of safe driving, especially driving on a highway. Thus, the driver can be freed extensively from mental and physical burdens which are normally imposed during driving, allowing safe driving to be performed.

Figure 33:
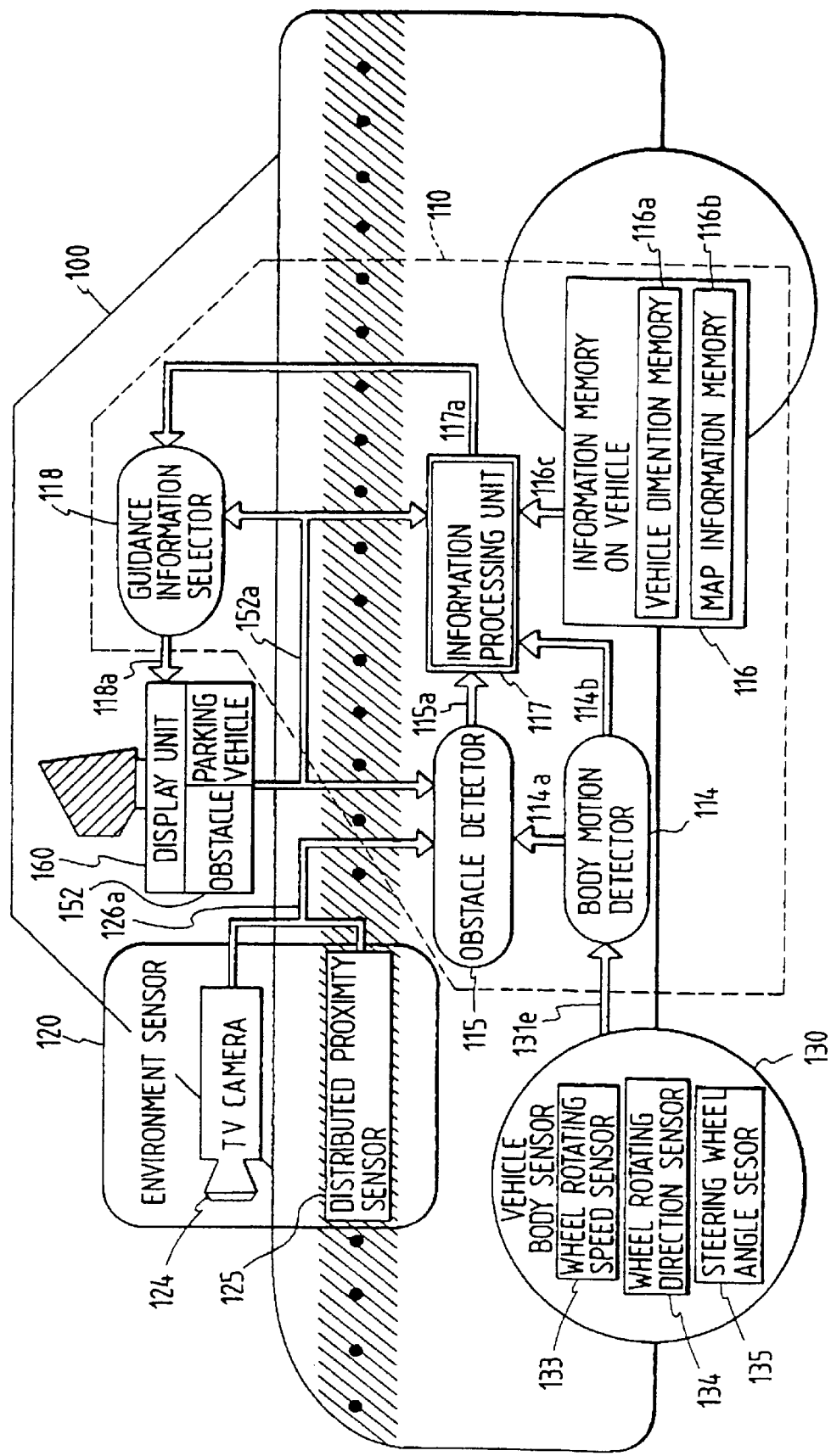
FIG. 33 is a block diagram showing the partial structure of a further embodiment of a vehicle driving support system in accordance with the present invention.

FIG. 33 shows the partial structure of a further embodiment of the vehicle driving system in accordance with the present invention. In the figure, the numeral 100 indicates a vehicle in which the vehicle driving support system in accordance with the present invention is mounted.

The support system 110 comprises a body motion detector 114, an obstacle detector 115, an information memory 116, an environmental information processing unit 117 and a guidance information selector 118, which are provided in a micro processing unit. An environmental sensor 120 has a TV camera 124 and a distributed proximity sensor 125. A vehicle body sensor 130 has a wheel rotating speed sensor 133, a wheel rotating direction sensor 134 and a steering wheel angle sensor 135. A command unit 152 is provided as a command input unit having a push-button to request information concerning obstacles around the vehicle and a push-button to request information concerning guidance in a parking lot.

The body motion detector 114 generates motion data 114a and 114b based on a motion signal 131e from the vehicle body sensor 130.

The obstacle detector 115 generates obstacle data 115a based on the environmental data 126a from the environmental sensor 120 and the motion data 114a from the body motion detector 114. The information memory 116 has a vehicle dimension memory 116a and a map information memory 116b.

The environmental information processing unit 117 generates various environmental information 117a concerning items located around the vehicle by performing calculations using the motion data 114b from the vehicle body sensor 114, the obstacle data 115a from the obstacle detector 115 and the memory data 116c from the information memory 116 based on the command signal 152a from the command unit 152. The guidance information selector 118 supplies suitable guidance information 118a to the display unit 160 by selecting the environmental information 117a generated by the information processing unit 117 corresponding to the command signal 152a.

Next, each of components which form the support system described above will be explained in detail.

The body motion detector 114 receives on the motion signal 131e a signal from the wheel rotating speed detector 133, a signal from the wheel rotating direction detector 134 and a signal from the steering wheel angle detector 135, obtains the running direction and the running speed of the vehicle using the motion signal 131e, and then outputs the result as the motion data 114a and 114b.

The obstacle detector 115 obtains the locations and the surface shapes of the obstacles around the vehicle using the TV camera 124 and/or the distributed proximity sensor 125 and the motion data 114a from the body motion detector 114 and outputs the result as the obstacle data 16.

The environmental information processing unit 115 obtains memory data 116c from the vehicle dimensions memory 116a and the map information memory 116b, motion data 114b from the body motion detector 114, and obstacle data 115a from the obstacle detector 115, and mixes them to calculate and output the environmental information 117 concerning the vehicle in real time corresponding to the real dimensions of the vehicle.

The guidance information selector 118 then selects the most proper guidance information 118a for the driver from the viewpoint of safety, allowance, etc. according to whether or not it is possible for the driver to judge the information subjectively. The selected result is output onto the display unit 160, such as an instrument panel, console panel and so on.

Although not shown in the Figure, the guidance information may be used to drive various devices that transmit information to other human senses than the visual sense, for example, a device that issues alarms and stakes the driver's seat to indicate that something important is occurring, as well as an image display.

Although not shown in the Figure, the guidance information system may be used to avoid an accident when a collision might occur by converting the information into a signal to control the brake and/or the steering wheel in a case where the ambient condition is judged to be dangerous.

According to this embodiment, as mentioned above, the present invention can provide a vehicle driving support system which can perform comparatively low level "data processing" work in the driver's "information generation works" (=interpretation of the environmental conditions).

Figure 34:
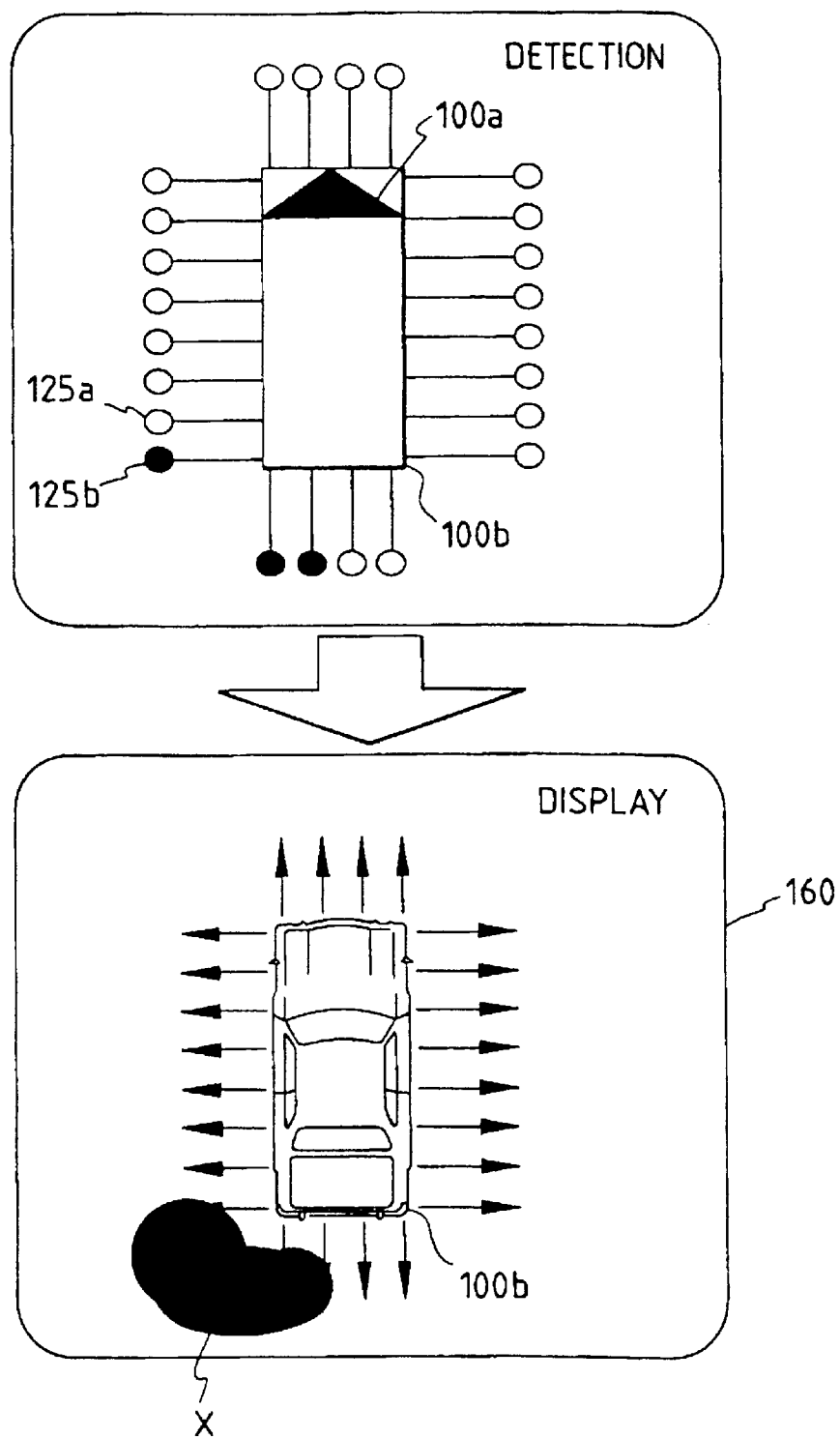
FIG. 34 is a picture showing a detected condition and its result displayed on a display unit obtained by a distributed proximity sensor used as an environmental condition sensor in the embodiment shown in FIG. 33.

FIG. 34 is a view showing a detected condition and the result displayed on the display unit 160, in which a distributed proximity sensor 125 is used as the environmental sensor 120. The distributed proximity sensor 125 may be, for example, a combination of an LED (near infrared ray diode) and PD (photo-diode) which is equipped on the periphery of a vehicle 100 in a belt-shape. The environmental signal 126a from the distributed proximity sensor 125 is used to get the shape information of the target obstacles detected near the subject vehicle. The information is output onto the display unit 160 as a bird's-eye view map that includes the vehicle itself.

The result detected by the distributed proximity sensor 125 is displayed, as shown in the figure, in such a way that when no obstacle is detected, a white circle 125a is displayed, and when an obstacle is detected, a black circle 125b is displayed. A black triangle 100a indicates the forward direction 100b of the vehicle. When data is displayed on the display unit 160, the driver can recognize an obstacle X existing in the rear left area of the vehicle and its shape.

Figure 35:
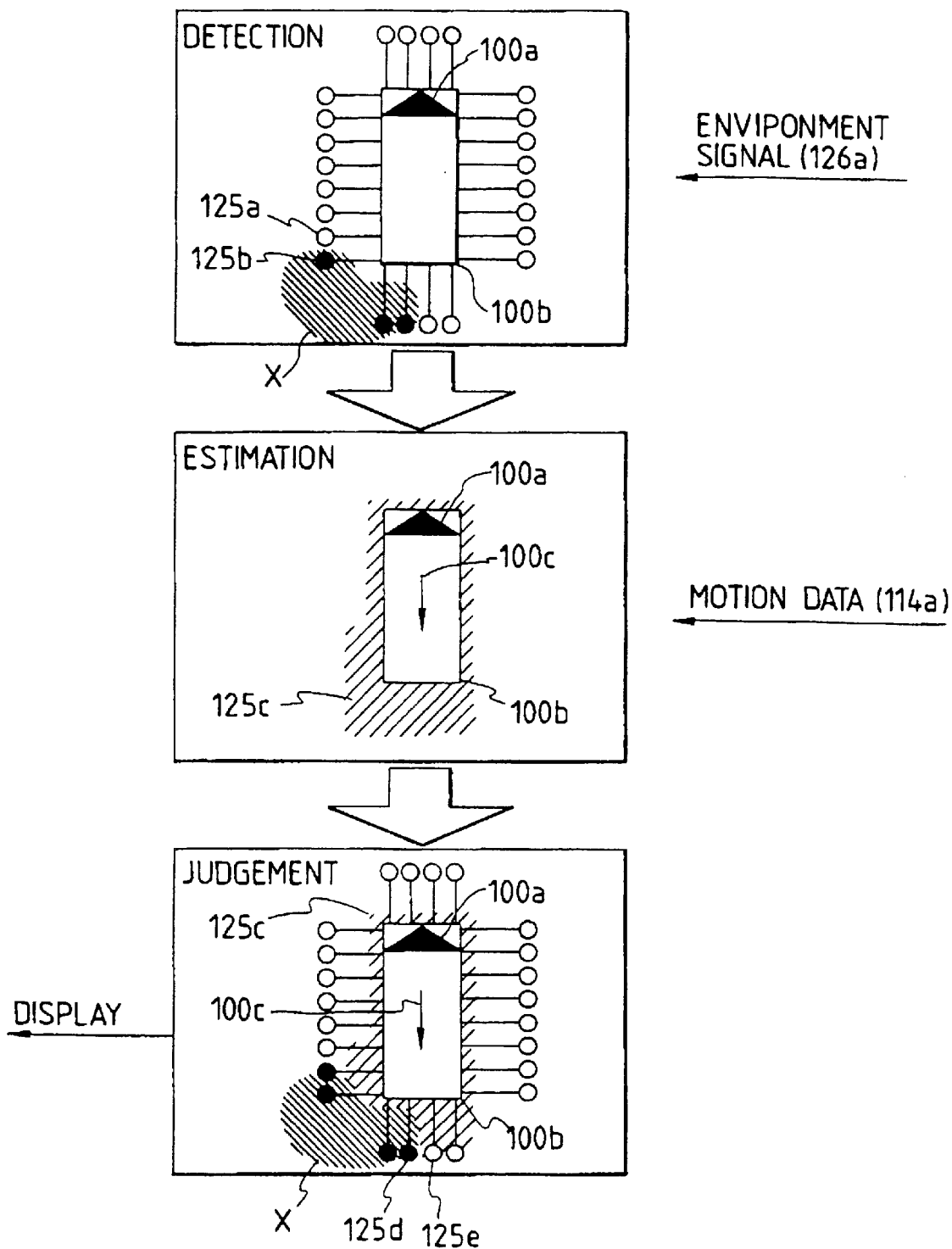
FIG. 35 is a picture showing a condition monitoring environment around a vehicle by using an environmental condition signal from said distributed proximity sensor in the embodiment shown in FIG. 33 and a motion data.
Figure 36:
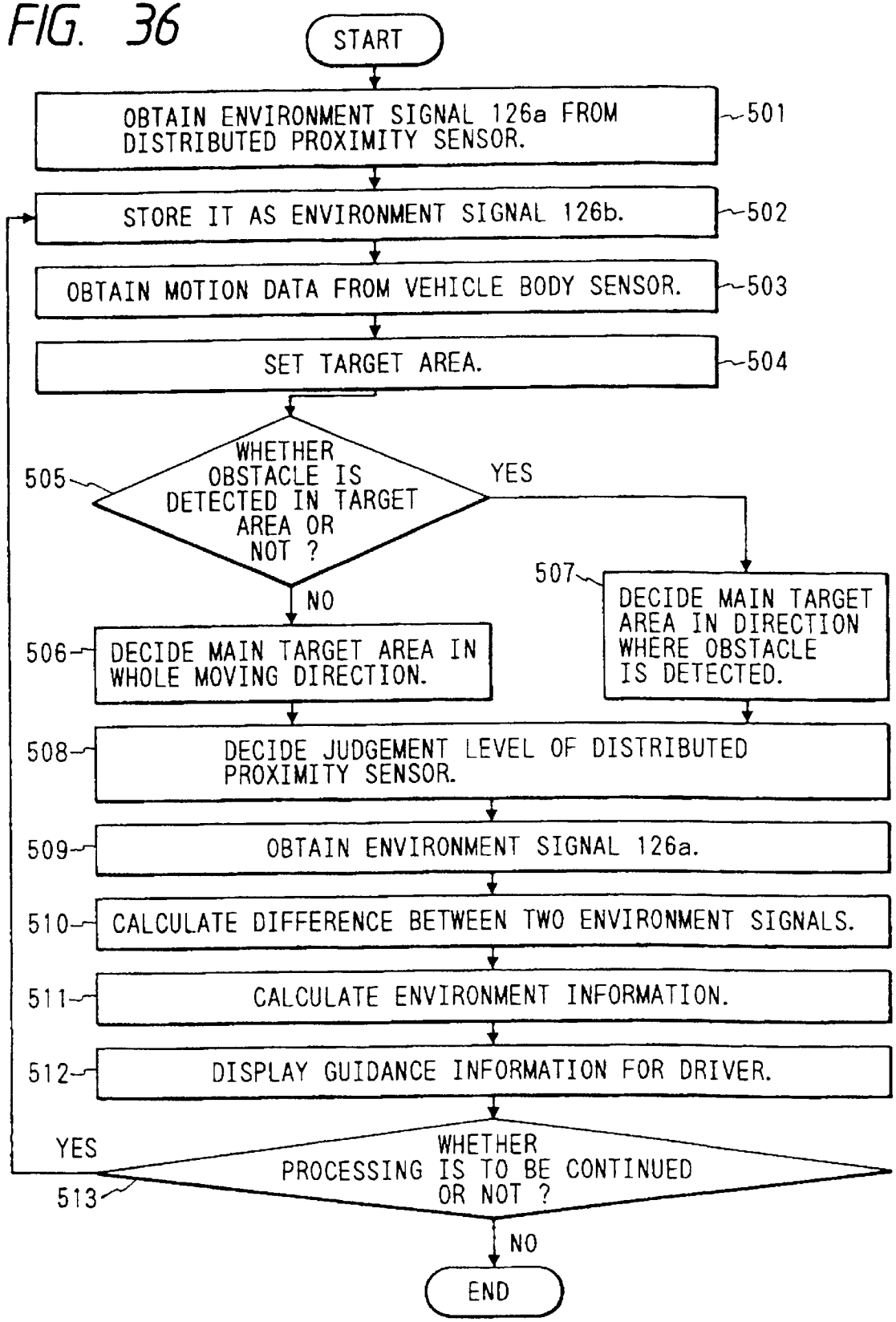
FIG. 36 is a flow diagram showing data processing for monitoring the environment around a vehicle executed by the information processing unit in the embodiment shown in FIG. 33.

FIG. 35 shows how the environmental conditions are monitored using the environmental signal 126a from the distributed proximity sensor 125 and the motion data 114a. Referring to FIG. 36, the processing flow for monitoring the environmental conditions will be explained.

In process 501, the environmental signal 126a, indicating various obstacles detected around the vehicle, is obtained from the distributed proximity sensor 125, and then in process 502 the signal is stored in the memory as an environmental signal 126b.

In process 503, the body motion detector 114 obtains the vehicle motion data 131e from the signals output from the wheel rotating speed detector 133, the wheel rotating direction detector 134 and the steering wheel angle detector 135, and then outputs motion data 114a and 114b.

In process 504, the obstacle detector 115 temporarily sets the vehicle's running direction as the target area referring to the environment signal 126b and the motion data 114a. And, in process 505, it is judged whether or not obstacles exist in the target area. When no obstacle is detected, it is decided that the area is a target area in process 506. When an obstacle exists, in process 507 the direction towards the obstacle is further checked to decide whether or not it can be selected as a target area. The accuracy of the distributed proximity sensor 125 is raised in such a way that only in the necessary area will the influence by noises be effectively reduced. In process 508, the obstacle detector 115 decides the judgment level for the detection area 125c and the discrimination of an existing obstacle. In process 509, the obstacle detector 115 receives the environmental signal 126a from the distributed proximity sensor 125. In process 510, the environmental signal 126b stored beforehand is subtracted from this environmental signal 126a to obtain more accurate obstacle data 115a.

In process 511, the environmental information processing unit 117 obtains the stored data on the vehicle dimensions 116c from the vehicle dimensions memory 116a, the motion data 114b from the body motion detector 114 and the obstacle data 115a from the obstacle detector 115 and calculates shape information on the vehicle itself and the obstacle X detected near the vehicle to produce the environmental information 117a corresponding to the vehicle motion.

After this, in process 512, in accordance with the command signal 152a from the command unit 152, the guidance information selector 118 generates the guidance information 118a which represents a bird's eye view map including the vehicle overlapped on other information and displays it on the display unit 161, providing accurate guidance information of the obstacle X at a proper timing.

In process 513, the obstacle detector 115, the environmental information processor 117 and the guidance information selector 118 then judge whether or not the processing needs to continue in accordance with the command signal 152a. When it is judged that it is necessary to continue, the processing returns to process 502 to store the environmental signal 126a as the environmental signal 126b.

Figure 37:
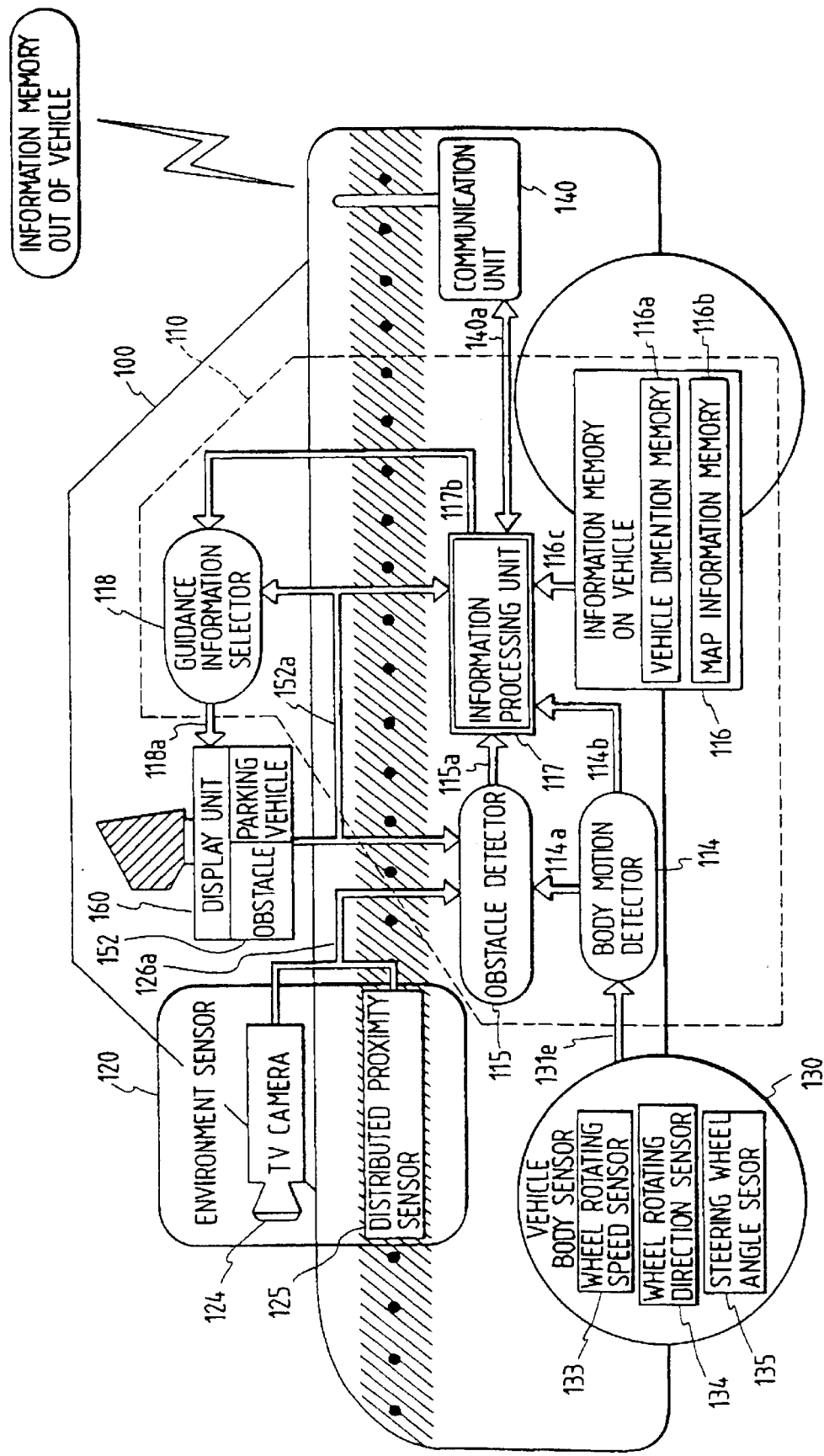
FIG. 37 is a block diagram showing the partial structure of a further embodiment of a vehicle driving support system in accordance with the present invention.

FIG. 37 shows the partial structure of a further embodiment of the vehicle driving support system in accordance with the present invention. The support system is a system formed by adding a communication unit 149 to the embodiment described with reference to FIG. 33–FIG. 36. The system can obtain wide ranged information, such as map information, congestion information, route direction information, information from other vehicles and so on in real time from an information memory outside of the vehicle 141 through road-vehicle, vehicle-vehicle or satellite communications for an infrastructure or the like. The communication unit 140 communicates with the information memory 141 while the communication unit 141 transfers the communication data 140a to the environmental information processor 117.

Figure 38:
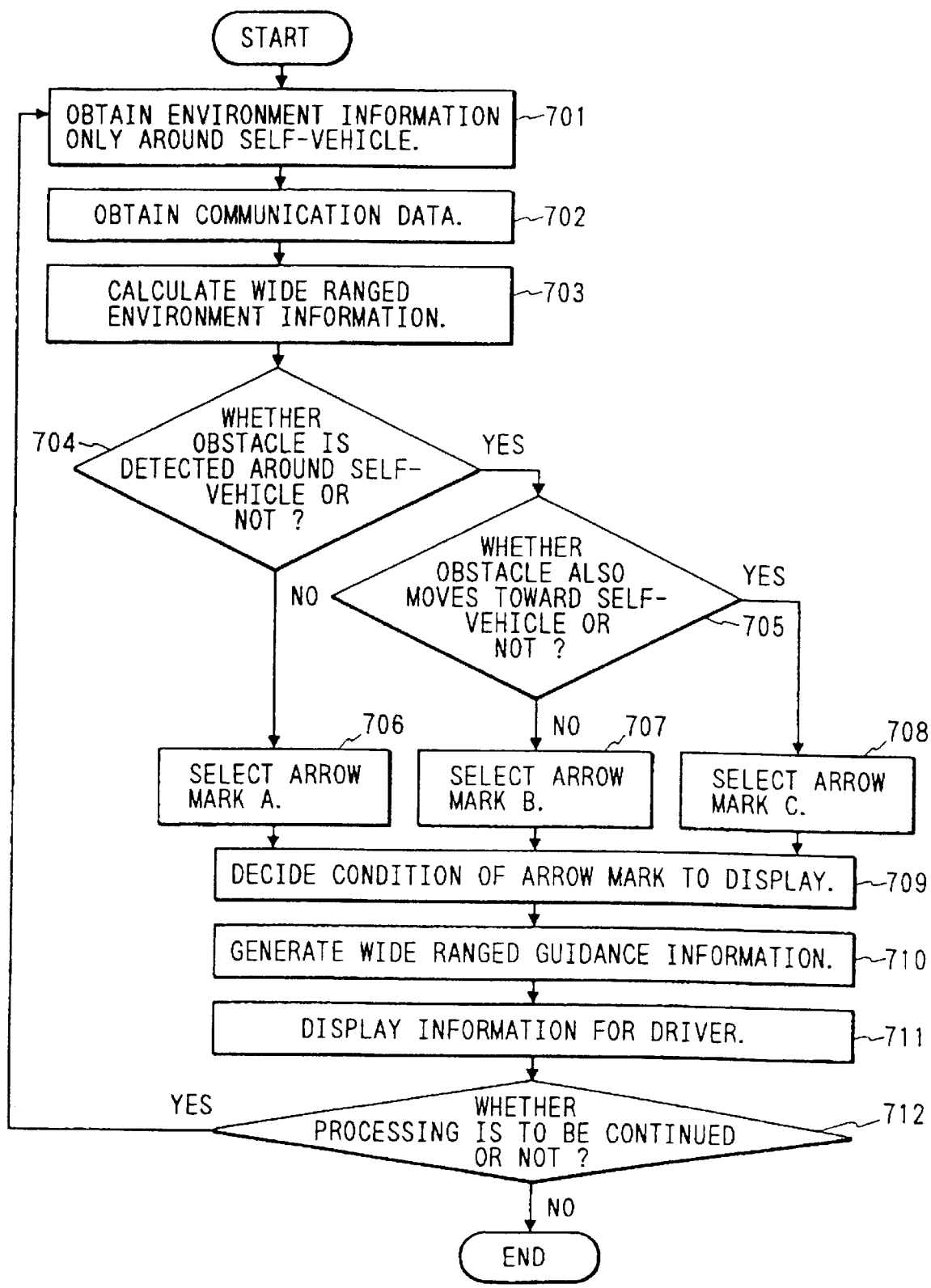
FIG. 38 is a flow diagram showing data processing to generate a guidance information for parking executed by the information processing unit in the embodiment shown in FIG. 37.
Figure 39:
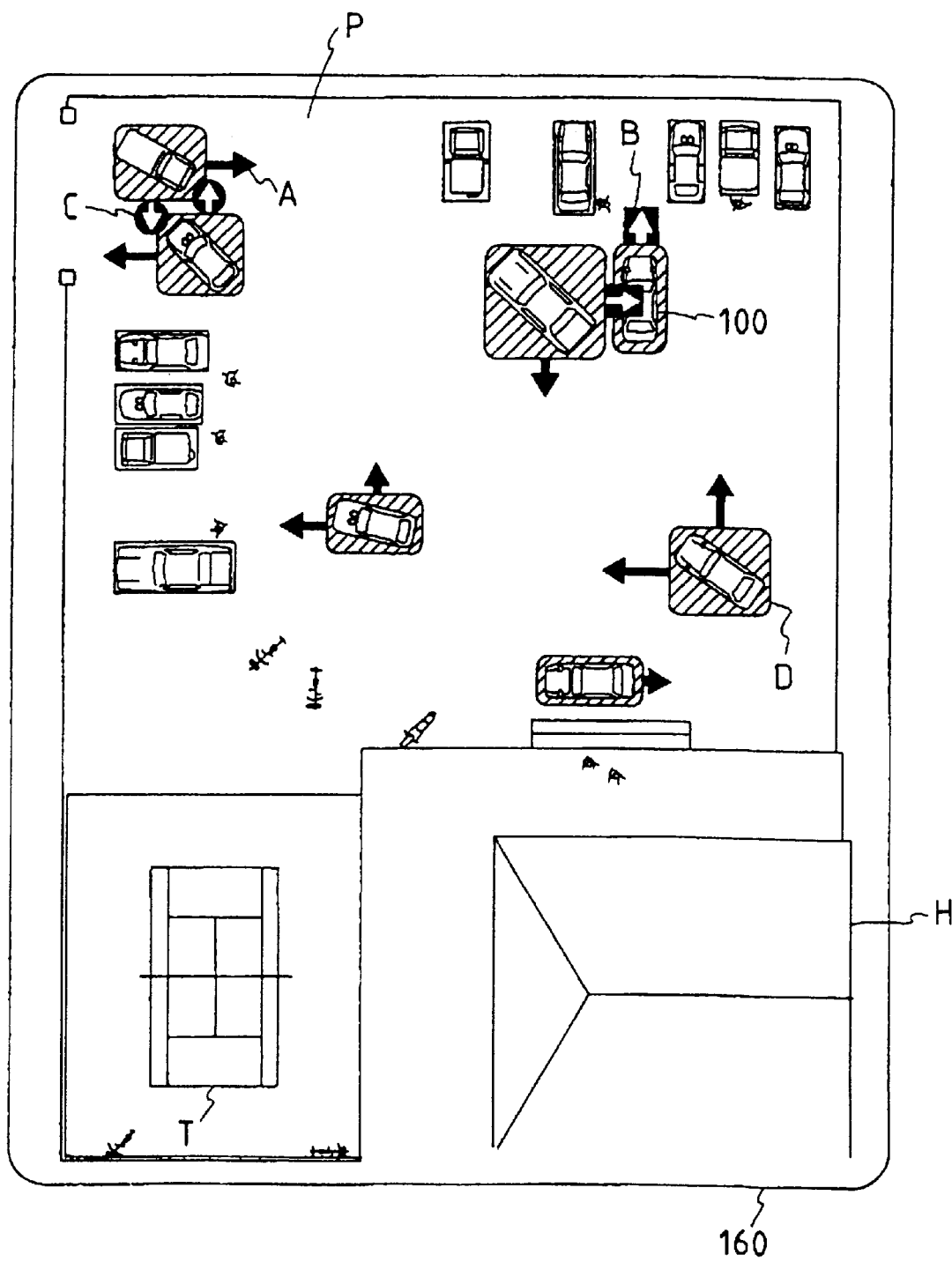
FIG. 39 shows a picture on a display unit displaying parking guidance information.
Figure 40:
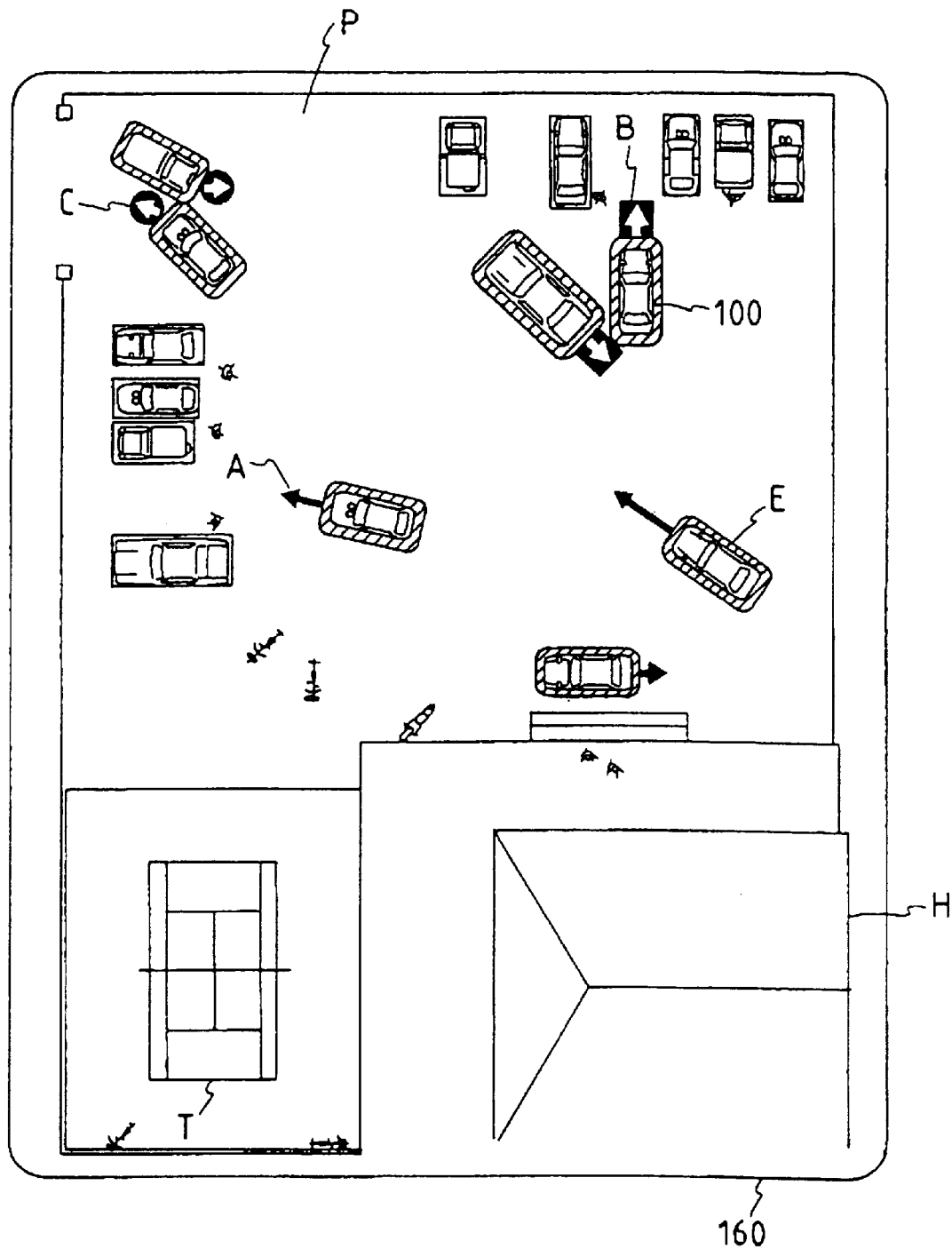
FIG. 40 shows another picture on a display unit displaying parking guidance information.

FIG. 38 shows the processing flow necessary to generate the guidance information for parking the vehicle using the support system shown in FIG. 37. FIG. 39 and FIG. 40 show examples of the bird's eye view map for the parking guidance. This processing flow is basically the same as that of the obstacle detection shown in FIG. 36. Referring to FIG. 38, the processing will be explained more in detail. The environmental information detected only around the subject vehicle in process 701 corresponds to the processes 501 through 511 as shown in FIG. 36.

Then, in process 702, the environmental information processor 117 obtains information from the distributed proximity sensor 125 mounted on another vehicle through the communication unit 140 as communication data 140a. In process 703, the information is mixed and calculated in said environmental information processing unit 117 to obtain the wide ranged environmental information 117b including an obstacle that might interfere with the vehicle motion.

As for the vehicle that is moving or might be about to move, the moving direction is displayed as a vector. The length of the arrow indicates the moving speed and the type of the arrow indicates the level of danger. Explaining more in detail, there are the following types of arrow: a solid black arrow A, a black square with a hollow arrow B, and a black circle with a hollow arrow C. The safety goes lower in order of A, B, and C. In other words, C has the highest possibility of collision or scraping. More specifically, the black arrow A indicates that no obstacle exists in the moving direction. The square with a hollow arrow B indicates that the vehicle is moving toward the obstacle. The circle with a hollow arrow C indicates that the obstacle (another vehicle ahead, which is regarded as an obstacle) is also coming toward the vehicle (approaching).

As a result, the guidance information selector 118 calculates whether or not an obstacle exists near the vehicle in process 704. When no obstacle exists, in process 706 the system selects the arrow A. When an obstacle exists, in process 705 the system further calculates whether or not the obstacle is coming towards the vehicle. If not, the system selects the arrow B in process 707. If the obstacle is coming, the system selects the arrow C in process 708. Then, in process 709, the system sets the direction and length of the arrow according to the moving direction and speed of each obstacle and sets the conditions of the arrow for display. The guidance information selector in process 710 generates the wide ranged guidance information 118a, and in process 711 the display unit 160 displays the result.

After this, in process 712, the obstacle detector 115, the environmental information processor 117 and the guidance information selector 118 judge whether to continue the processing again with reference to the command signal 152a. If judged necessary, the processing returns to process 701.

The driver can know the condition of the entire space around the vehicle, for example, with the wide ranged guidance information 118 displayed as shown in FIG. 39. Thus, the driver can select the most proper parking area for him. In addition to the presence or absence of obstacles, the driver can also obtain information on the level of danger and the direction in which the obstacle is detected.

The driver can also use the information concerning the area around the parking lot P, such as the presence of a house H, a tennis court T and the like, to select an action to be taken freely and efficiently after he leaves his vehicle.

As for a vehicle that faces in an oblique direction, in FIG. 39 the direction into which the vehicle is moving or is about to move actually is displayed as a block D. In FIG. 40, however, the vehicle is regarded as a block E which is sectioned with partial lines both perpendicular and parallel to the vehicle in a top plan view. The vector of the moving direction is divided into vectors of the X and Y directions. Each vector is then displayed as an arrow corresponding to the level of danger in each direction. These two displaying methods can be selected to provide an optimized parking guidance. For example, the displaying method will be as shown in FIG. 39, when the current parking condition has to be known as early as possible, and will be as shown in FIG.

40, when the allocation of vehicles has to be considered or the level of danger has to be found.

Figure 41:
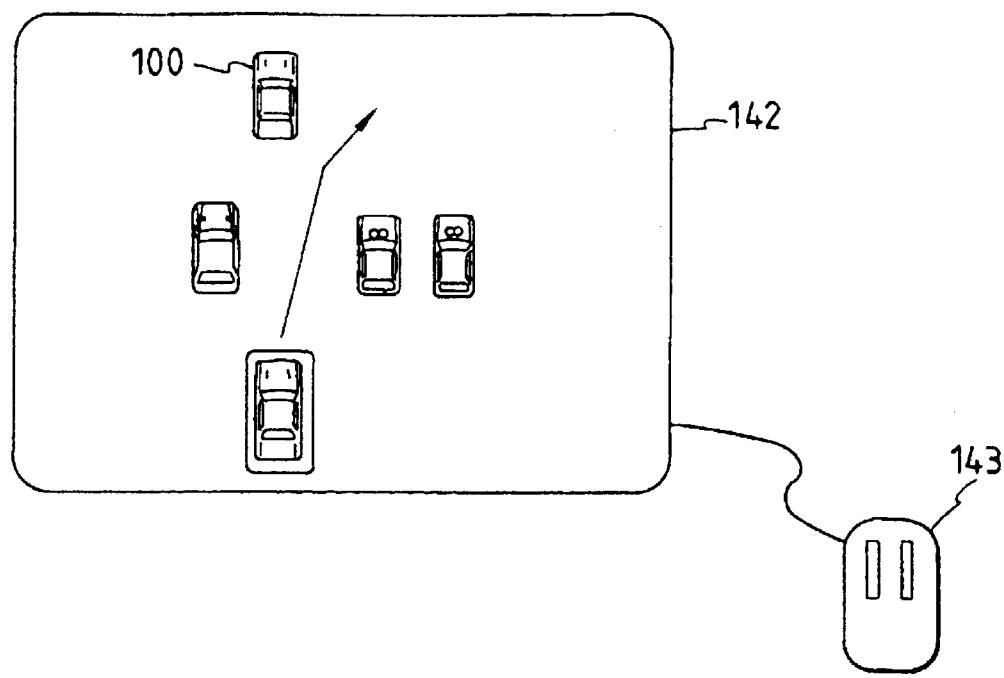
FIG. 41 is a block diagram showing the partial structure of an information memory out of vehicle.
Figure 42:
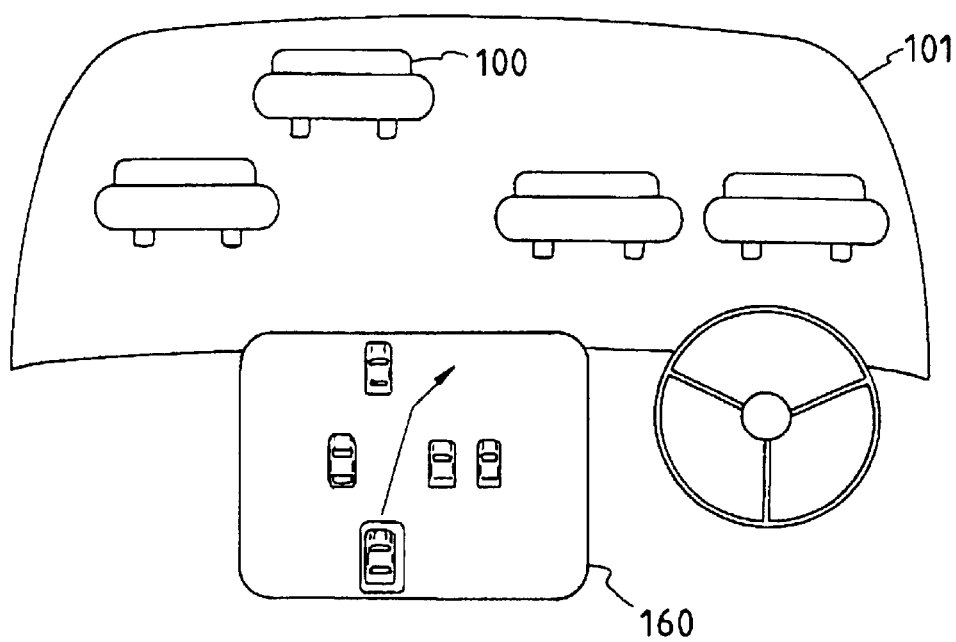
FIG. 42 is a picture showing a driver's view during parking with guiding.

FIG. 41 shows a part of the outside information memory 141. An example of image information displayed on the display unit 142 in said information memory used by the parking manager is shown in the figure. FIG. 42 shows the visual field of the driver during the parking guidance operation. As the manager gives direction information to go into the parking area to the vehicle 100 using a mouse 143, said information is transferred to the environmental information processor 177 through the communication unit 140 and is displayed onto the display unit 161. The driver can be led to the parking area much more efficiently both in space and time than in a case where he must rely only on information given from the manager directly through the windshield. In addition, another method to support the parking of the vehicle 100 can also be considered. In this case, the driver does not need to direct his vehicle to the parking area. The driver and/or the manager gives the directions to allocate a parking area to the vehicle 100. The guidance information is transmitted to the vehicle itself according to the directions.

As explained above, the present invention can provide the driver with optimized information depending upon various running conditions by constructing an integrated support system through selectively combining the parts in the embodiments described above.

What we claim is:

1. A vehicle driving support system for facilitating the driving of a vehicle by a driver, comprising:

environment detecting means for obtaining objective information concerning objects located around a vehicle;

running mode specifying means for selectively specifying one from a plurality of running modes of the vehicle;

information processing means for selectively generating one of a plurality of different kinds of driving operation reference information corresponding to a specified running mode of the vehicle by processing said objective information detected in accordance with a specified running mode; and indicating means for communicating said driving operation reference information to a driver of the vehicle, wherein said running mode specifying means includes command input means for generating a command signal in response to a driver's input operation to specify that said vehicle is in a normal running mode or in a congestion running mode, said information processing means including means for monitoring a preceding vehicle stopped in front of said vehicle and for generating driving operation reference information to indicate the starting of said preceding vehicle during the congestion running mode, and further including means for generating preferable reference distance information between a preceding vehicle and said vehicle during the normal running mode, and the informing means includes means for notifying the driver by selectively displaying the driving operation reference information indicative of the starting of the preceding vehicle when the congestion running mode is specified by the driver and selectively displaying the preferred reference distance when the normal running mode is specified by the driver.

2. A vehicle driving support system for facilitating the driving of a vehicle by a driver, comprising:

environment detecting means for obtaining objective information concerning objects located around a vehicle;

running mode specifying means for selectively specifying one from a plurality of running modes of the vehicle;

information processing means for selectively generating one of a plurality of different kinds of driving operation reference information corresponding to a specified running mode of the vehicle by processing said objective information detected in accordance with a specified running mode; and indicating means for communicating said driving operation reference information to a driver of the vehicle, wherein said environment detecting means includes a distance information detector for obtaining distance information indicating a distance between said vehicle and an object located in front thereof, said running mode specifying means comprising command input means for generating a command signal in response a driver's input operation to specify that said vehicle is in a normal running mode or in a congestion running mode, and said information processing means includes means for monitoring a vehicle stopped in front of said vehicle and for generating driving operation reference information to inform the driver of the starting of the stopped vehicle during the congestion running mode, and further including means for generating preferable reference distance information between a preceding vehicle and said vehicle during the normal running mode, and the informing means includes means for notifying the driver by selectively displaying the driving operation reference information indicative of the starting of the preceding vehicle when the congestion running mode is specified by the driver and selectively displaying the preferred reference distance when the normal running mode is specified by the driver.

3. A vehicle driving support system for facilitating the driving of a vehicle by a driver, comprising:

environment detecting means for obtaining objective information concerning objects located around a vehicle;

running mode specifying means for selectively specifying one from a plurality of running modes of the vehicle;

information processing means for selectively generating one of a plurality of different kinds of driving operation reference information corresponding to a specified running mode of the vehicle by processing said objective information detected in accordance with a specified running mode; and indicating means for communicating said driving operation reference information to a driver of the vehicle, wherein said running condition specifying means includes input means for specifying that said vehicle is in a narrow passage running condition or in a parking lot running condition in response to a driver's input operation, said information processing means including means, responsive to the vehicle being in the narrow passage running condition, for monitoring an object near said vehicle according to a relative positional relationship thereof to said vehicle and for generating driving operation reference information to inform the driver thereof, and responsive to the vehicle being in the parking running condition, for generating driving operation reference information to inform the driver of the distribution of objects existing in a parking lot, wherein the indicating means includes means for notifying the driver by selectively displaying the driving operation reference information regarding the relative positional relationship of the object near the vehicle when the narrow passage running mode is specified by the driver and for selectively displaying the information regarding the distribution condition of objects existing in the parking lot when the parking running mode is specified by the driver.

4. A vehicle driving support system according to claim 1 or claim 2, wherein said informing means comprises a display unit to display character information and driving operation reference information indicating a specified running mode of the vehicle.

5. A vehicle driving support system according to claim 1 or claim 2, wherein said informing means comprises a head-up display unit to display driving operation reference information onto a windshield of the vehicle.

6. A vehicle driving support system comprising a vehicle body sensor mounted on a vehicle to detect both direction and speed of said vehicle; body motion detecting means to detect vehicle motion in response to signals from said body sensor; an environment sensor mounted on the periphery of the vehicle body to detect nearby obstacles; obstacle detecting means responsive to signals from said vehicle motion detecting means and said environment sensor for detecting the presence/absence of obstacles in the running direction of the vehicle, as well as the size, shape and location of an obstacle when any obstacle exists; an information memory in which data representing vehicle dimensions and map information are stored; environment information processing means for calculating environment information concerning objects around the vehicle based on information received from said body motion detecting means, said obstacle detecting means and said information memory; guidance information selecting means responsive to environment information calculated by said environment information processing means for selecting vehicle guidance information among a plurality of guidance information based on decision criteria concerning safety; and indicating means to inform the driver of the vehicle of the selected guidance information.

7. A vehicle driving support system according to claim 6, wherein said indicating means includes a device which displays guidance information in a visual information form.

8. A vehicle driving support system according to claim 6, wherein said indicating means includes a device which outputs guidance information in an aural information form.

9. A vehicle driving support system according to claim 6, wherein said indicating means includes a device which outputs guidance information in a tactile information form.

10. A vehicle driving support system according to claim 6, further comprising a controller to control operating means for operating a running of the vehicle based on said guidance information.

11. A vehicle driving support system according to claim 6, wherein said body sensor comprises a wheel rotating speed detector to detect the rotating speed of a wheel, a wheel rotating direction detector to detect the rotating direction of a wheel, and a steering wheel angle detector to detect the rotational angle of a steering wheel.

12. A vehicle driving support system according to claim 6, wherein said environment sensor comprises a TV camera to detect obstacles ahead of the vehicle as image information, and a distributed proximity sensor mounted on a periphery of the vehicle body to detect nearby obstacles in a non-contacting way.

13. A vehicle driving support system according to claim 6, wherein said obstacle detecting means includes means for obtaining information on obstacles which may interfere with the vehicle motion through processing of environment data received from the environment sensor and motion data received from the body motion detecting means.

14. A vehicle driving support system according to claim 6, wherein said informing means comprises a display unit to display nearby obstacles overlapping on a bird's-eye view map of the vehicle.

15. A vehicle guidance information system comprising a vehicle body sensor to detect both the direction and the speed of a vehicle; body motion detecting means to detect vehicle motion on the basis of signals received from said body sensor; an environment sensor mounted on the periphery of the vehicle body to detect nearby obstacles; obstacle detecting means responsive to signals received from said vehicle motion detecting means and said environment sensor for detecting the to presence/absence of obstacles in the running direction of the vehicle, as well as the size, shape and location of an obstacle when any obstacle exists; an information memory in which information such as vehicle dimensions and map information are stored; communicating means to communicate with a communication system including a ground or satellite communication system and another vehicle's communication system, to obtain wide ranged environment information of the environment around the vehicle; environment information processing means to calculate the wide ranged environment information based on information received from said body motion detecting means, said obstacle detecting means, said information memory and said communicating means; guidance information selecting means responsive to environment information calculated by said environment information processing means for selecting vehicle guidance information among a plurality of vehicle guidance information based on decision criteria on safety; and indicating means for informing a driver of the vehicle of the selected guidance information.

16. A vehicle driving support system according to claim 15, wherein said informing means comprises a display unit to display a wide ranged bird's-eye view map of an area around the vehicle based on environment map information obtained through said communication means, as well as to make said vehicle guidance information overlap on said bird's-eye view map for display.

17. A vehicle having a vehicle driving support system according to one of claims 1, 2, 3, 6 and 9, wherein said indicating means comprises a display unit mounted near the driver's seat.

18. A vehicle driving support system according to claim 6, wherein said environment information processing means calculates the moving directions of the vehicle and the obstacles, said informing means displaying said moving directions of the vehicle and the obstacles on a display.

19. A vehicle driving support system according to claim 6, wherein said informing means comprises a head-up display unit to display driving operation reference information onto a windshield of the vehicle.

20. A vehicle driving support system according to claim 15, wherein said informing means comprises a head-up display unit to display driving operation reference information onto a windshield of the vehicle.

21. A method for generating driving reference information to facilitate driving of a vehicle by detecting environmental conditions around the vehicle, comprising:

detecting conditions around the vehicle corresponding to a plurality of different running modes of the vehicle and for generating environmental data concerning such conditions around the vehicle; and selectively generating, by processing said environmental data, one of a plurality of different kinds of driving reference information suitable for a corresponding running mode of said vehicle, said plurality of different kinds of driving reference information including information indicative of the start of a preceding vehicle which is in front of said vehicle and in a stop state, preferable reference distance information indicative of a preferred distance between the preceding vehicle which is cruising in front of said vehicle, a relative position with respect to an object present in the proximity of said vehicle, and a distribution of objects present in a parking lot, whereby to facilitate the driving of the vehicle in said running mode.

22. A method for facilitating the driving of a vehicle by a driver, comprising:

obtaining objective information concerning objects located around a vehicle;

selectively specifying one from a plurality of running modes of the vehicle;

selectively generating one of a plurality of different kinds of driving operation reference information corresponding to a specified running mode of the vehicle by processing said objective information detected in accordance with a specified running mode, said plurality of different kinds of driving operation reference including information indicative of the start of a preceding vehicle from a stopped position in front of said vehicle, preferable reference distance information indicative of a preferred distance between a preceding vehicle cruising in front of said vehicle and said vehicle, a relative position with respect to said vehicle of an object present in the proximity of said vehicle and a distribution of objects present in a parking lot; and communicating said driving operation reference information to a driver of the vehicle.

23. A method according to claim 22, wherein said method further comprises:

generating a command signal in response to a driver's input operation to specify that said vehicle is in a normal running mode or in a congestion running mode;

monitoring a preceding vehicle stopped in front of said vehicle and generating driving operation reference information to indicate the starting of said preceding vehicle when a command signal of the congestion running mode is generated; and generating preferable reference distance information between a preceding vehicle and said vehicle when a command signal of the normal running mode is generated.

24. A method according to claim 22, wherein said method further comprises:

obtaining distance information indicating a distance between said vehicle and an object located in front thereof;

generating a command signal in response a driver's input operation to specify that said vehicle is in a normal running mode or in a congestion running mode;

monitoring a vehicle stopped in front of said vehicle and generating driving operation reference information to inform the driver of the starting of the stopped vehicle when a command signal of the congestion running mode is generated; and generating preferable reference distance information between a preceding vehicle and said vehicle when a command signal of the normal running mode is generated.

* * * * *